United States Patent [19]
Yohe et al.

[11] Patent Number: 6,012,085
[45] Date of Patent: *Jan. 4, 2000

[54] APPARATUS AND METHOD FOR INCREASED DATA ACCESS IN A NETWORK FILE OBJECT ORIENTED CACHING SYSTEM

[75] Inventors: Thomas Patrick Yohe, Dayton; Gordon L. Dorworth, Spring Valley, both of Ohio; Jon J. Penner, Austin, Tex.; Scott Hertzog; Brian C. Morris, both of Round Rock, Tex.

[73] Assignee: Stampede Technolgies, Inc., Dayton, Ohio

[*] Notice: This patent is subject to a terminal disclaimer.

[21] Appl. No.: 08/956,190

[22] Filed: Oct. 22, 1997

Related U.S. Application Data

[63] Continuation-in-part of application No. 08/888,311, Jul. 3, 1997, which is a continuation-in-part of application No. 08/565,393, Nov. 30, 1995, Pat. No. 5,682,514.

[51] Int. Cl.$^7$ ...................................................... G06F 12/08
[52] U.S. Cl. .......................... 709/217; 709/203; 709/212; 709/216; 709/218; 711/118; 711/130
[58] Field of Search ..................................... 709/203, 212, 709/216, 217, 218; 711/118, 130

[56] References Cited

U.S. PATENT DOCUMENTS

| | | | |
|---|---|---|---|
| 4,410,944 | 10/1983 | Kronies | 711/147 |
| 5,151,989 | 9/1992 | Johnson et al. | 707/10 |
| 5,222,224 | 6/1993 | Flynn et al. | 711/144 |
| 5,226,143 | 7/1993 | Baird et al. | 711/145 |
| 5,261,069 | 11/1993 | Wilkinson et al. | 711/145 |
| 5,274,787 | 12/1993 | Hirano et al. | 711/143 |
| 5,276,835 | 1/1994 | Mohan et al. | 711/144 |
| 5,297,269 | 3/1994 | Donaldson et al. | 711/145 |
| 5,301,290 | 4/1994 | Tetzaff et al. | 711/142 |
| 5,394,555 | 2/1995 | Hunter et al. | 711/148 |
| 5,404,483 | 4/1995 | Stamm et al. | 711/144 |
| 5,428,761 | 6/1995 | Herlihy et al. | 711/130 |
| 5,452,447 | 9/1995 | Nelson et al. | 707/205 |

*Primary Examiner*—Krisna Lim
*Attorney, Agent, or Firm*—R. William Graham

[57] ABSTRACT

An apparatus for increased data access in a network includes a file/object server computer having a permanent storage memory, a cache verifying computer operably connected to the file/object server computer in a manner to form a network for rapidly transferring data, the cache verifying computer having an operating system, a first memory and a processor capable of performing an operation on data stored in the permanent storage memory of the file/object server computer to produce a signature of the data characteristic of one of a file, an object and a directory, a remote client computer having an operating system, a first memory, a cache memory and a processor capable of performing an operation on data stored in the cache memory to produce a signature of the data, a communication server operably connected to the remote client computer to the cache verifying computer and the file/object server computer and comparators operably associated with the cache verifying computer and remote client computer for comparing the signatures of data with one another to determine whether the signature of data of the remote client is valid.

19 Claims, 20 Drawing Sheets

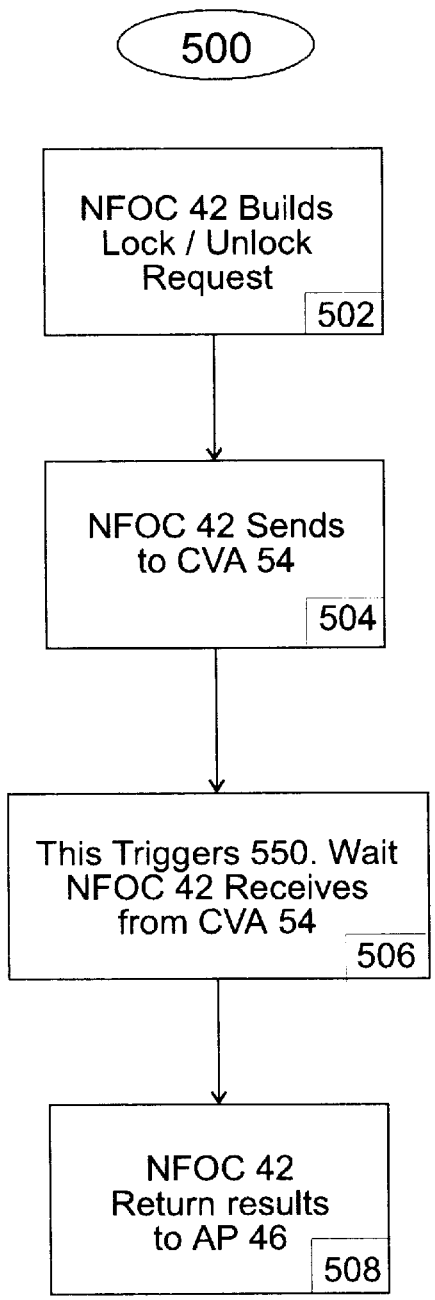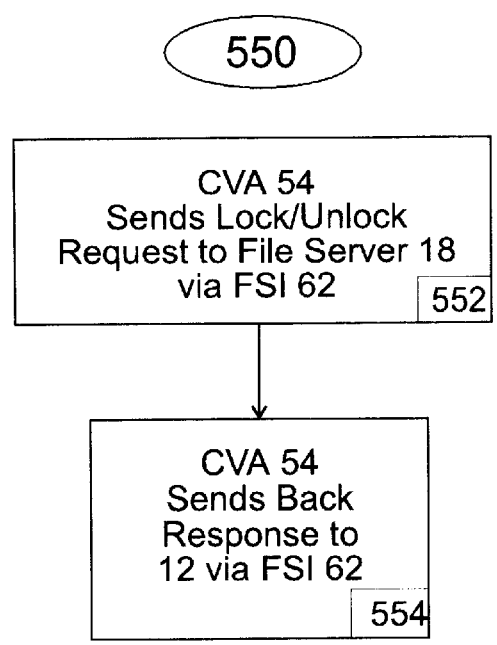
Fig. 11
Fig. 12

APPARATUS AND METHOD FOR INCREASED DATA ACCESS IN A NETWORK FILE OBJECT ORIENTED CACHING SYSTEM

This is a continuation-in-part of U.S. Ser. No. 08/888,311 filed Jul. 3, 1997 which is a continuation-in-part of U.S. Ser. No. 08/565,393 filed Nov. 30, 1995 which is issued into U.S. Pat. No. 5,682,514 on Oct. 28, 1997.

BACKGROUND OF THE INVENTION

1. Field of the Invention

The present invention relates to data access in a file/object oriented network system. More particularly, the present invention is directed to a client-agent-server utility which increases the speed in which data in the form of files, objects and directories are accessed across slow link communications via remote node caching and provides verification, selective object compression, selective prefetch and concatenation of fresh objects and indicators of cache correctness.

2. Related Art

Many operating systems are equipped to handle caching and verifying of data. Traditionally, in a remote client's caching system, optimization in retrieving data is limited to prefetching. In other words, an application program in a remote client requests from a file server transmission of a predetermined number of bytes of information (e.g., x bytes) and the operating system on the client prefetches the requested data plus another number of bytes of information (e.g., x+y bytes). Thus, when the application requests the bytes, it already exists in its readily accessible memory (cache).

In addition, there also exist problems with verification of directories in existing systems. It has been found, for example, that two remote clients concurrently accessing data and attempting to verify a directory will not necessarily obtain the same data due to the fact that the data from the file server computer will not necessarily send out the data in the same order to each of the remote clients. Thus, there is no clear indication whether the directory data is current.

In a desktop caching system, a high speed memory is used to cache data that is stored on a hard disk. While a desk-top cache program, such as Microsoft's SmartDrive, is a useful tool to increase performance from the random access memory (RAM), this type of caching technique is not applicable to remote environments because of its inability to correctly handle multiple remote clients accessing the same data files concurrently, i.e., it is likely to corrupt the data.

File servers have employed caching techniques which parallel techniques of the desktop. Here, the file server deviates in protecting against multiple common data user access by implementing or providing a file locking service to clients.

Many object oriented network systems include web browsers which commonly manifest themselves on an object retrieval side of the remote client, such as Netscape's Navigator or as Lotus Notes clients, and include web servers which commonly manifest themselves on the object server side, such as Notes servers, are equipped to maintain a cache of objects to avoid unnecessary retrieval of objects from a network of object providers. Cache correctness is determined through a given technique.

Existing object oriented network systems often employ a client-agent-server utility (the "agent") to further reduce unnecessary retrieval of objects from a network of object provider. These agents are often termed as "proxy servers" since they retrieve objects from a network of object providers on behalf of a set of clients. In this situation, the agent maintains a cache of objects and monitors and responds to object retrieval requests from one or more remote clients. The agent may fulfill the request which emanates from a client by retrieving the object from its cache rather than forwarding the request to the network of object providers.

As shown in FIG. 1, the related art includes a remote client computer having an operating system (OS) with a file system interface (FSI). Operatively connected to the FSI is a local file system (LFS) which in turn is operatively connected to a RAM based disk cacher (RBDC), disk driver (DD) and permanent storage disk (PSD). The PSD may include object retrieval application cache (ORAC) and object collection Replicas (OCRs).

Object retrieval applications (ORAs) exist in the remote client which have the ability to retrieve objects and to store OCRs into the PSD via the LFS via the FSI. These OCRs are retrieved through an Object Retrieval/Storage interface (ORSI) which employs an Object Retriever (OR).

Operatively connected to the FSI is a network file redirector (NFR) with prefetch capability, and a network transport layer (NTL) connected to a WAN driver. Aside from the OS, there exist application programs (AP) which employs the OS via the FSI. A communication server (CS) connects to the remote client computer and includes a WAN driver, routing layer and LAN driver. The CS connects through a LAN link to a file server computer.

The file/object server computer has an OS. The file/object server computer OS includes an NTL connected to a LAN driver and an FSI connected to LFS which in turn is connected to an RBDC, a DD and a PSD. Aside from the OS, there exists a file/object server application which employs the OS via the FSI.

An object proxy server (OPS) may also exist operatively connected to the communication server and the file object server. The OPS includes and ORSI, and OR, NTL, LAN driver, FSI, RBDC and DD as shown in FIG. 1. The OPS maintains an object cache for the purpose of maintaining an object cache on PSD via an FSI. The OPS retrieves objects via an ORSI which is operatively connected to an Object Retriever (OR).

The problem associated with these prior systems is their inability to provide a remote client user with greater speed of access to file/object server data and/or file/object server directories. This is especially so because of the type of link in which the remote client may be accessing the data through, such as a modem phone link. In the context of the present invention, "remote client" is defined as a user, accessing data over a relatively slow link, such as a modem phone link. A typical modem phone link provides a transfer rate of about 28.8 kilobits of information per second. This is contrasted with a link in a LAN connection which can transfer at about 10 Megabits per second. These remote clients are thus greatly limited in speed of access.

SUMMARY OF THE INVENTION

The present invention overcomes the above described deficiencies which exist with remote clients accessing and verifying objects and data in files and directories from a file/object oriented network environment.

If is an object to increase the speed in which a remote client can access data and directories.

It is another object to maintain integrity of the accessed data and directory while increasing the speed in which the data is accessed.

A further object is to implement a cache verifying agent to act as a caching verifier between a remote client and a file server computer.

Still, another object is to add intelligence to a remote client in order to reduce the overall time in which a remote client accesses data.

Another object is to overcome the deficiencies of data transfer for a remote client.

Other objects and advantages will be readily apparent from reading the following description and viewing the drawings.

Accordingly, the present invention is directed to an apparatus for increased data access in a network, which includes a file/object server computer having a permanent storage memory, a cache verifying computer operably connected to the file/object server computer in a manner to form a network for rapidly transferring data, the cache verifying computer having an operating system, a first memory and a processor with means for performing an operation on data stored in the permanent storage memory of the file/object server computer to produce a signature of the data characteristic of one of a file, an object and directory, a remote client computer having an operating system, a first memory, a cache memory and a processor with means for performing an operation on data stored in the cache memory to produce a signature of the data, a communication server operably connected to the remote client computer, the cache verifying computer and the file/object server computer, and a comparator operably associated with the cache verifying computer and remote client computer for comparing the signatures of data with one another to determine whether the signature of data of the remote client is valid. The remote client computer includes means responsive to each comparison performed by the comparator on the data for generating and storing a validation ratio for the data in the first memory and for removing the data from the cache memory when the validation ratio drops below a predetermined value. The cache verifying computer includes means for recognizing a LOCK request from the remote client computer and for obtaining a lock on the data from the file server computer in response to the LOCK request.

The cache verifying computer includes the means for performing compression/decompression operations on data, means for recognizing a REPLICATION-SYNCHRONIZE request from the remote client computer and performing an analysis of data to be streamed back to the remote client computer to fulfill the REPLICATION-SYNCHRONIZE request, means associated with the recognizing means for determining and retrieving data associated with the data to be streamed, and means for storing data into permanent storage. The data can be file or object oriented.

Terminology

"Caching" is the function of retrieving an object from a relatively high speed storage device from a list of most-recently-used objects. "Cache" is a file which resides in permanent storage and contains the most-recently-used blocks of data read from a remote file/object server. "Data" referred to herein is inclusive of an object, directory and/or a file. "File/object oriented distributed network," as used in the present invention, will include a network wherein the file/object server computer data is accessed via the following set of file system or object retrieval primitives: OPEN, CREATE, READ, WRITE, SEEK, LOCK, UNLOCK, CLOSE, DIRECTORY REQUEST, GET OBJECT, and SYNCHRONIZE COLLECTION REPLICATION.

"File" means a collection of related data records treated as a basic unit of storage.

"File/Object Server Computer" is a computer which includes a processor with its associated memory, an operating system, and a permanent storage memory.

A cached object is considered "stale" if it is found to be incoherent with the actual object as stored on the file/object server.

A cached object is considered "fresh" if it is found to be coherent with the actual object as stored on the object server.

A "Handle" is the internal address of a unique data structure that describes characteristics about a file, object, object collection or object database.

An "Object" is a sequence of data of variable length.

An "Open Method" is an indicator of the actions that a program will take after opening a file or object database. The actions may be one or more of, but not limited to, read-only, write-only, open-for program execution only, open exclusively, open with the intention of locking regions prior to update, etc.

"Permanent storage memory," as used herein, includes, but is not limited to, disk drive, flash RAM or bubble memory, for example.

A "Reverse Channel" is the means by which a response message is sent over the same network layer interface in which a request was received.

A "Sub-object" is a portion of an Object.

A "Validator" is a relatively short stream of data which is returned by an object server along with an object which is to be presented to the object server for purposes of validating the requestor's object cache.

BRIEF DESCRIPTION OF THE DRAWINGS

FIG. 11 illustrates a flow chart of the operations of the present invention corresponding to LOCK requests on remote client computer.

FIG. 12 illustrates a flow chart of the operations of the present invention corresponding to LOCK requests on cache verifying computer.

DETAILED DESCRIPTION OF A PREFERRED EMBODIMENT

Figure 1:
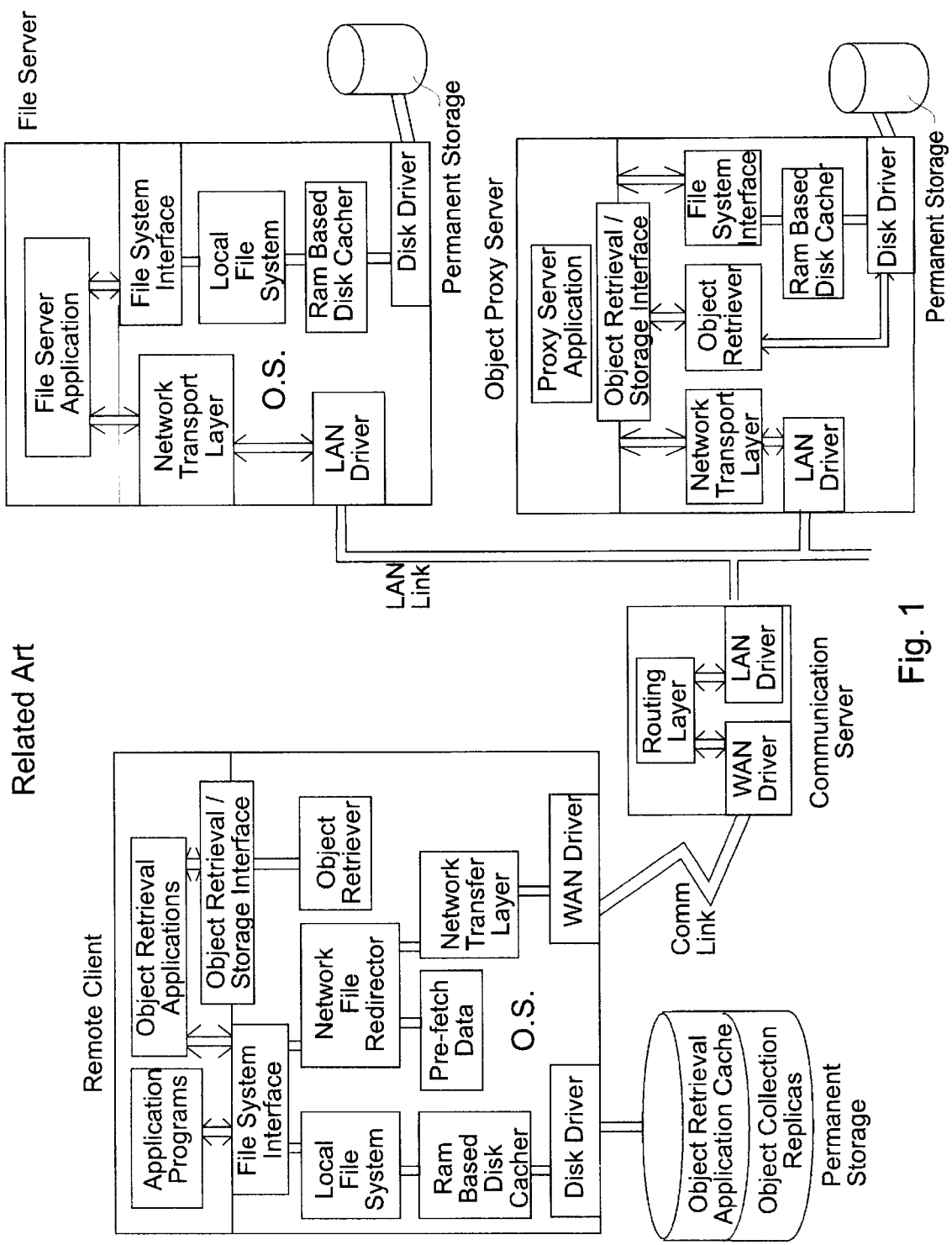
FIG. 1 illustrates the block diagram configuration of the related art.
Figure 2:
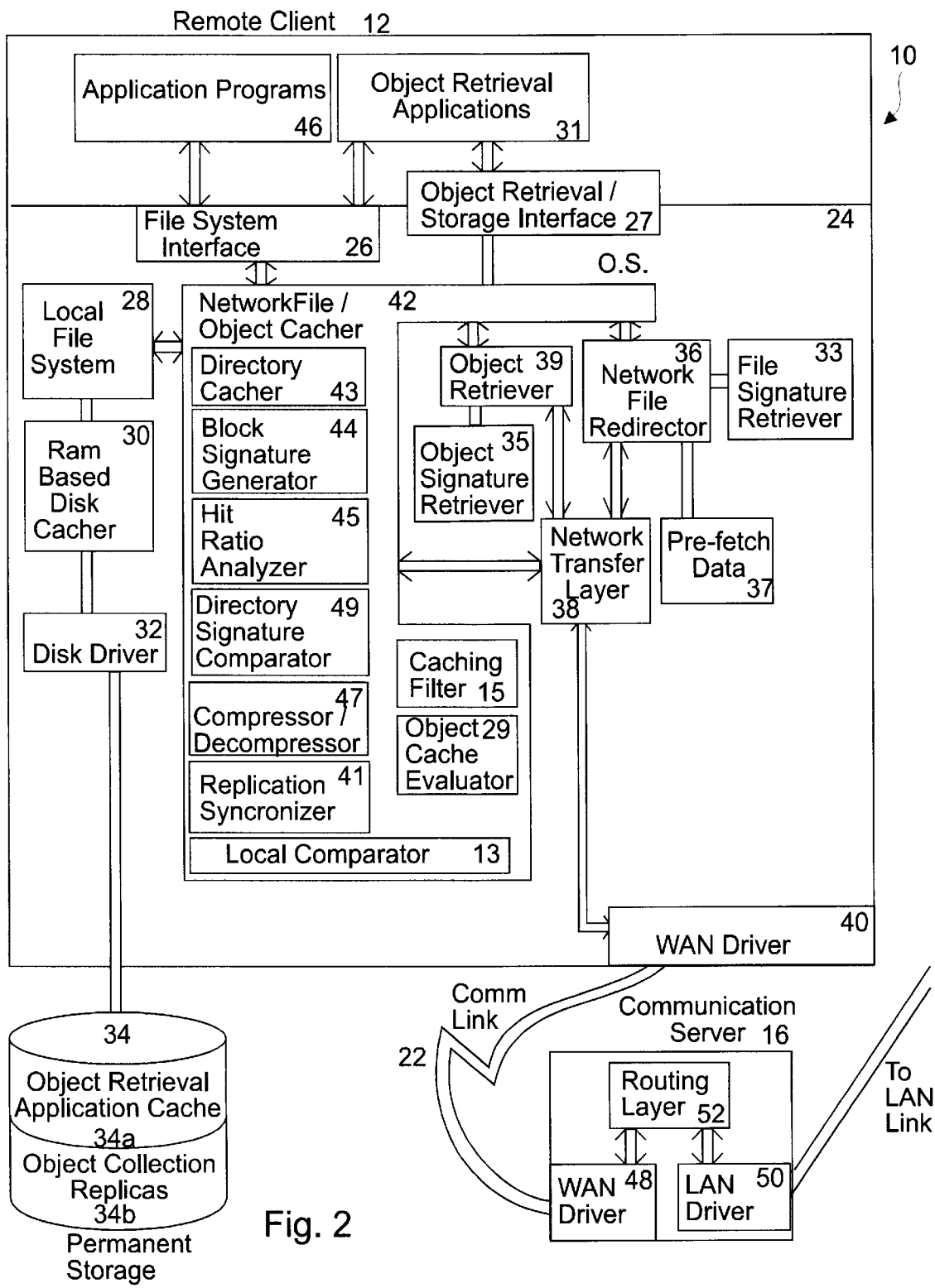
FIG. 2 illustrates the block diagram configuration of the present invention.
Figure 2:
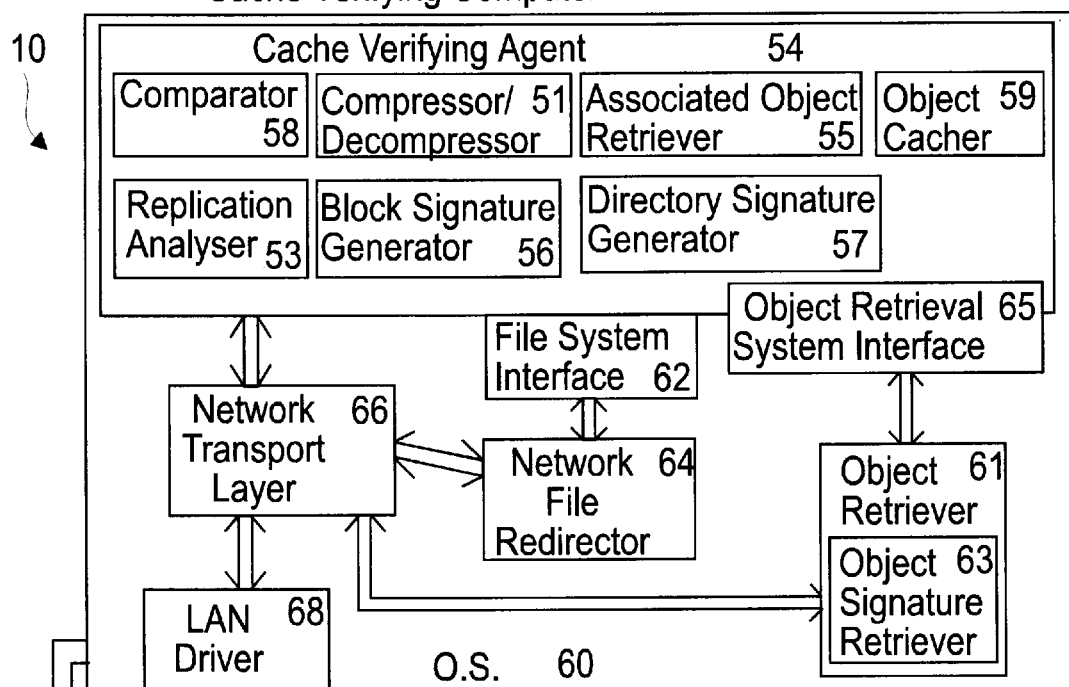
Figure 2:
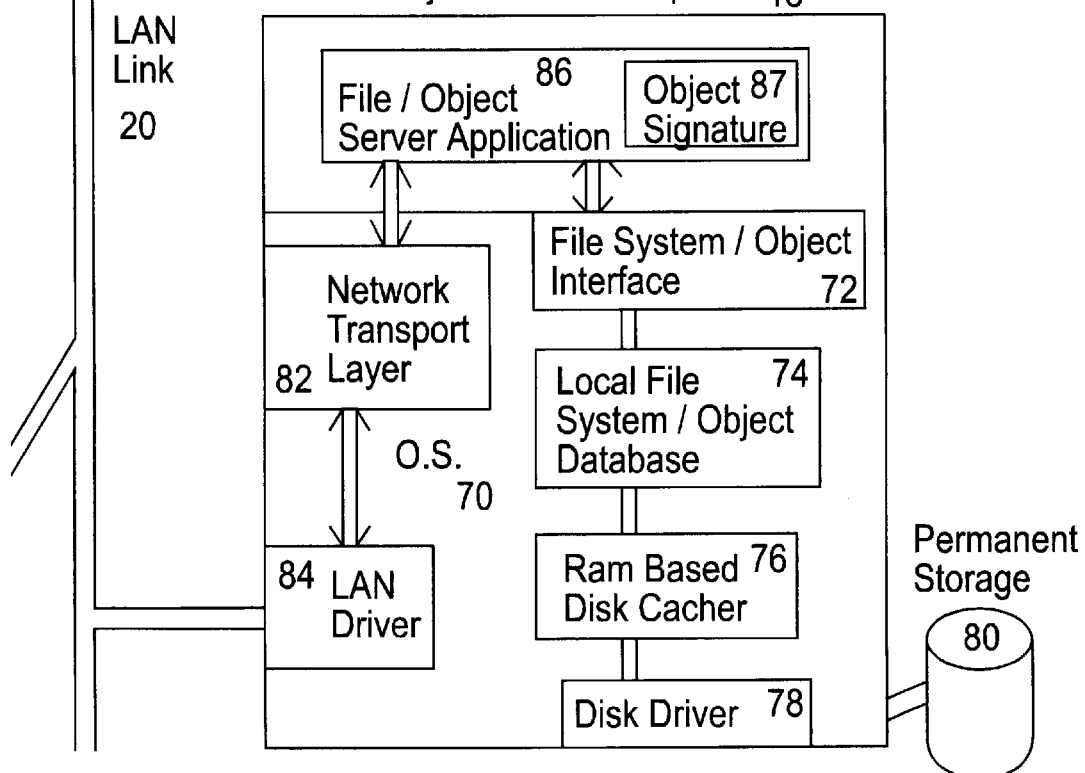
Figure 3:
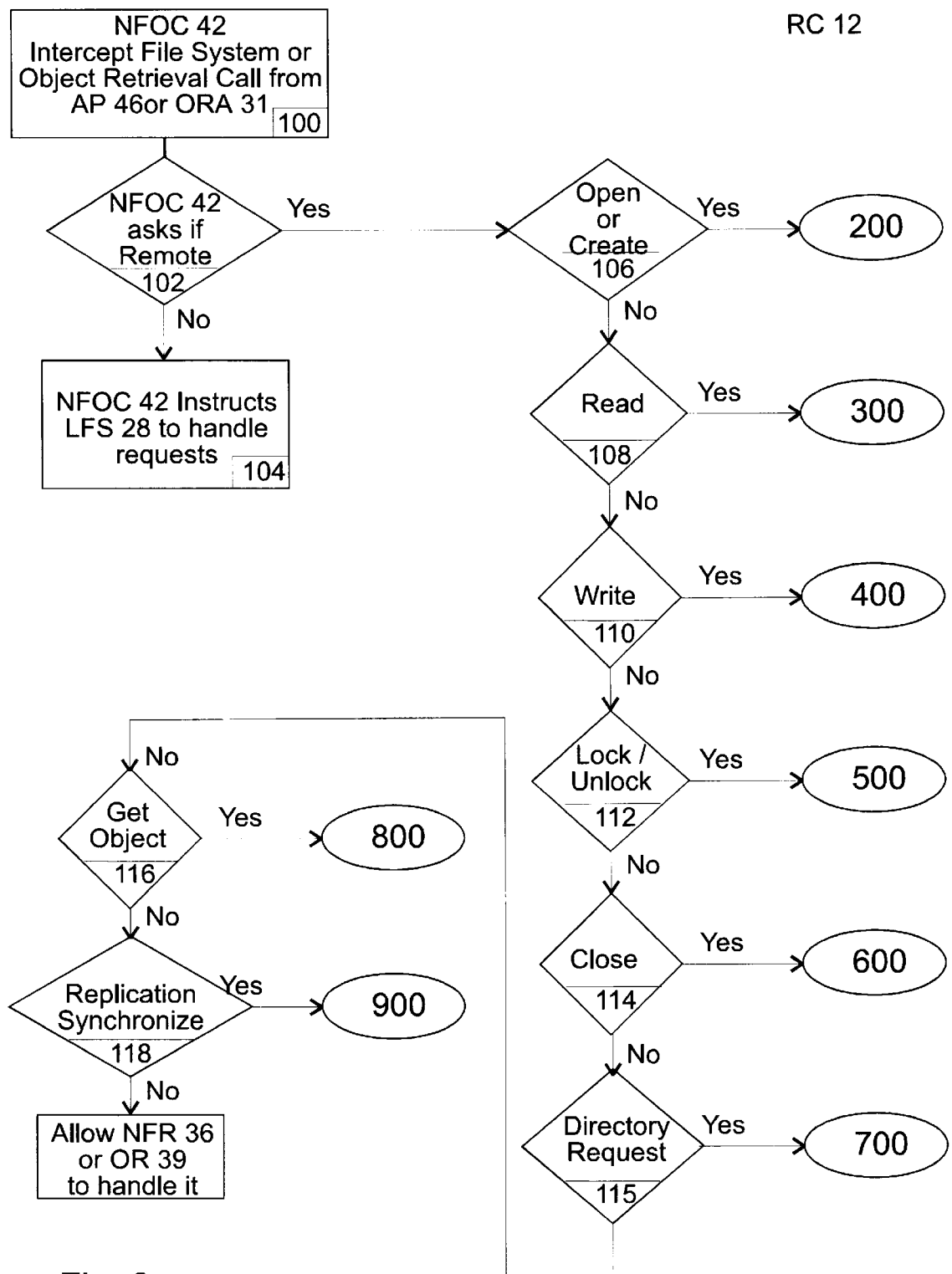
FIG. 3 illustrates a flow chart of the operations of the present invention corresponding to the requests within a remote client.
Figure 4:
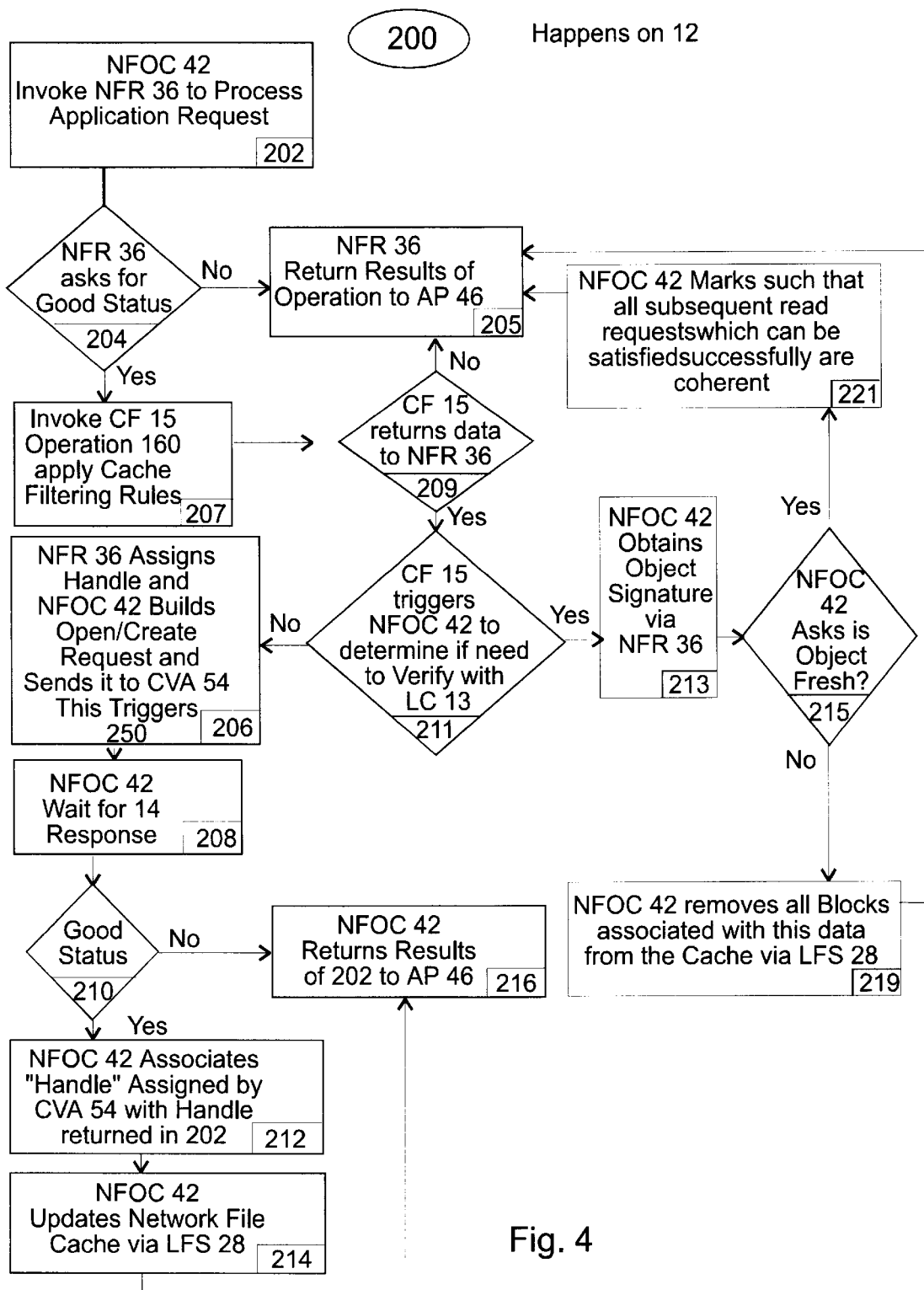
FIG. 4 illustrates a flow chart of the operations of the present invention corresponding to OPEN/CREATE requests on remote client computer.
Figure 4A:
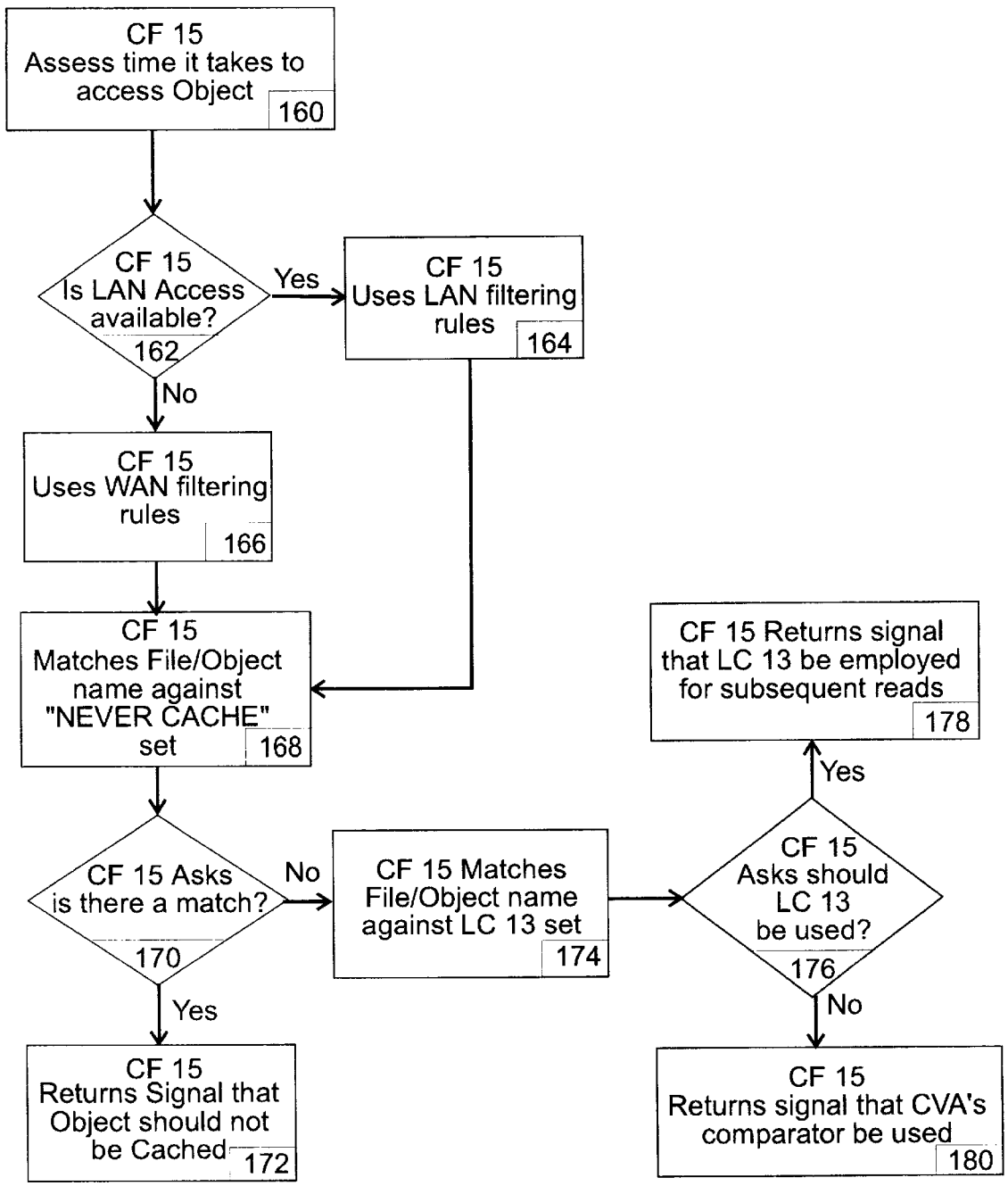
FIG. 4a illustrates a flow chart of the operations of the present invention corresponding to a part of the operations in FIG. 4.
Figure 5:
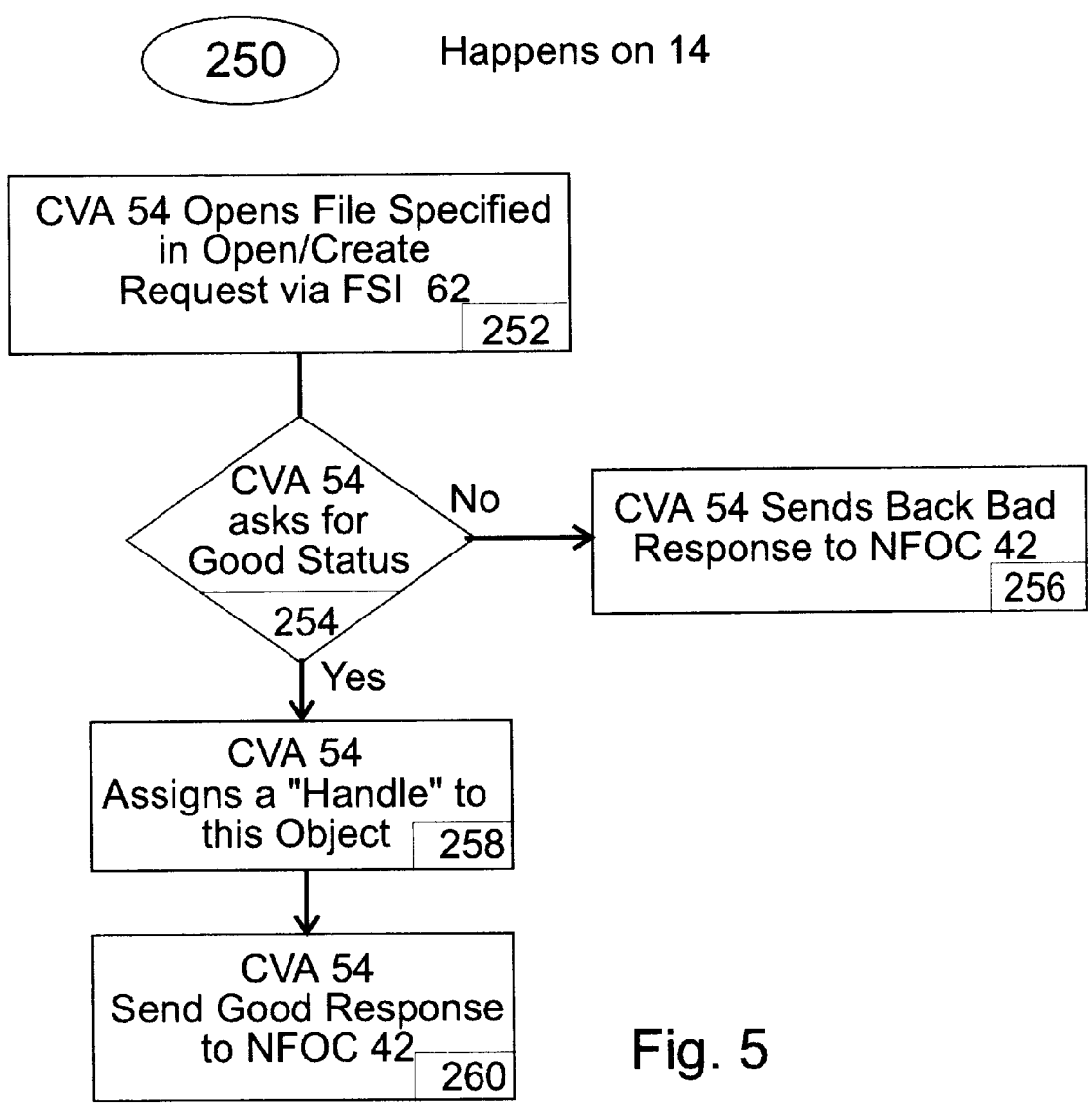
FIG. 5 illustrates a flow chart of the operations of the present invention corresponding to OPEN/CREATE requests on cache verifying computer.
Figure 6:
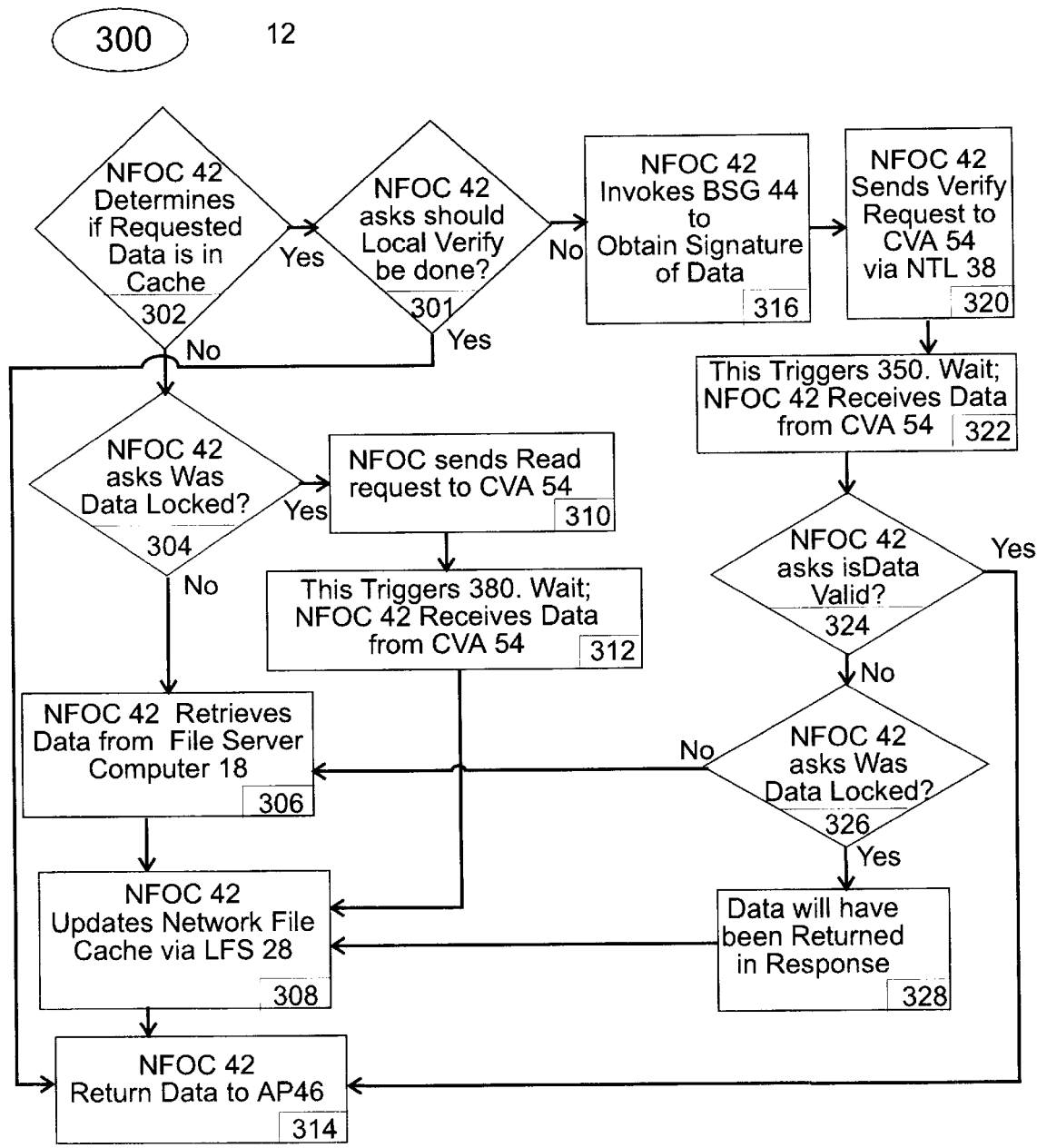
FIG. 6 illustrates a flow chart of the operations of the present invention corresponding to READ requests on remote client computer.
Figure 7:
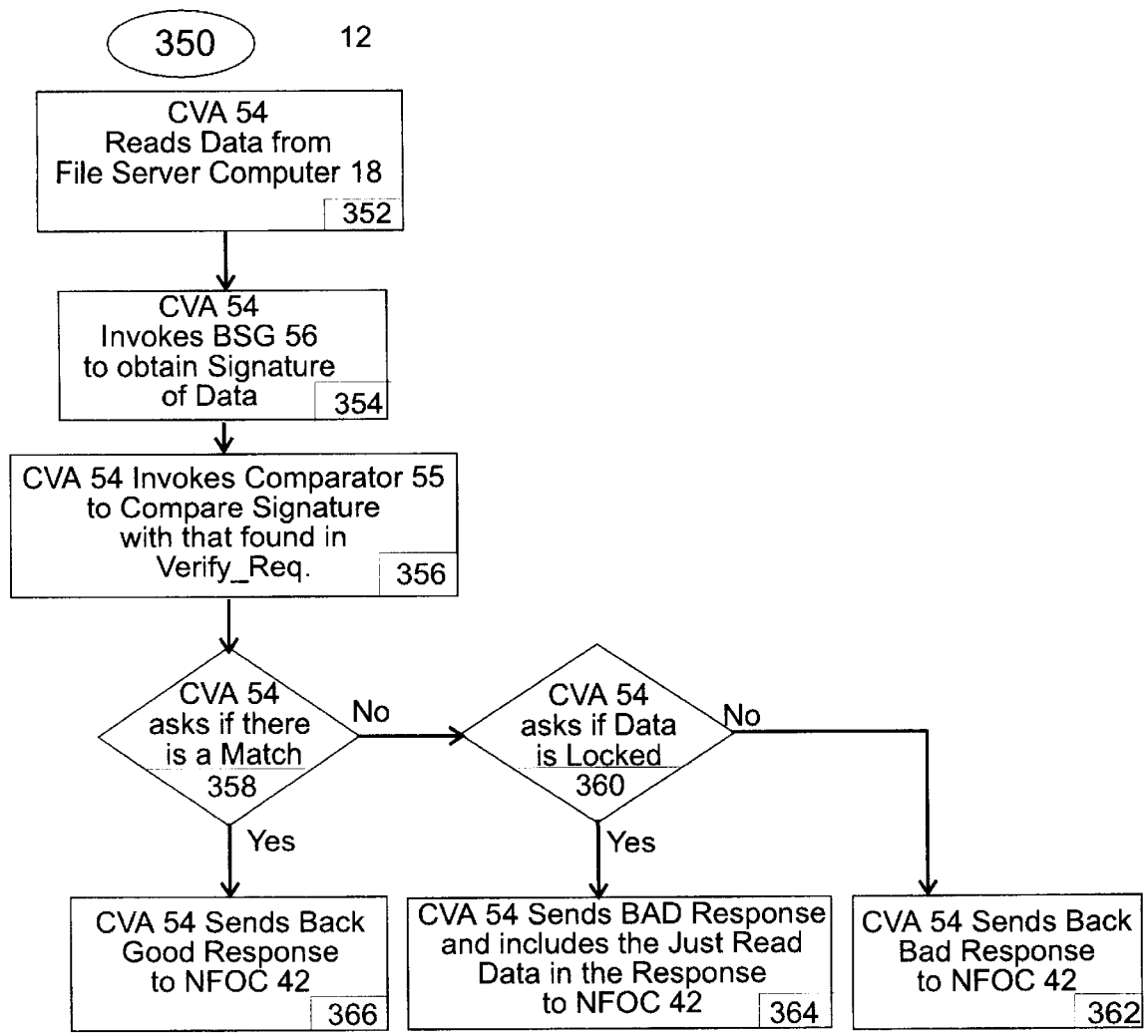
FIG. 7 illustrates a flow chart of the operations of the present invention corresponding to READ requests on cache verifying computer.
Figure 8:
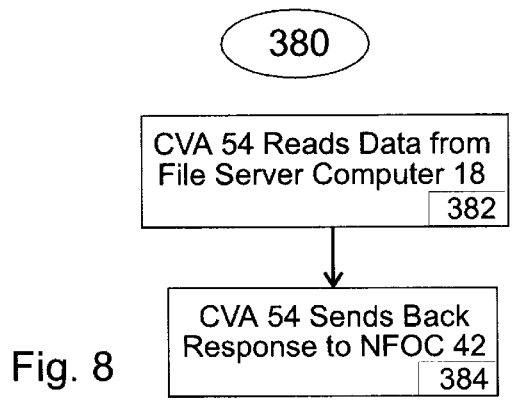
FIG. 8 illustrates a flow chart of additional operations of the present invention corresponding to READ requests in the cache verifying computer.
Figure 9:
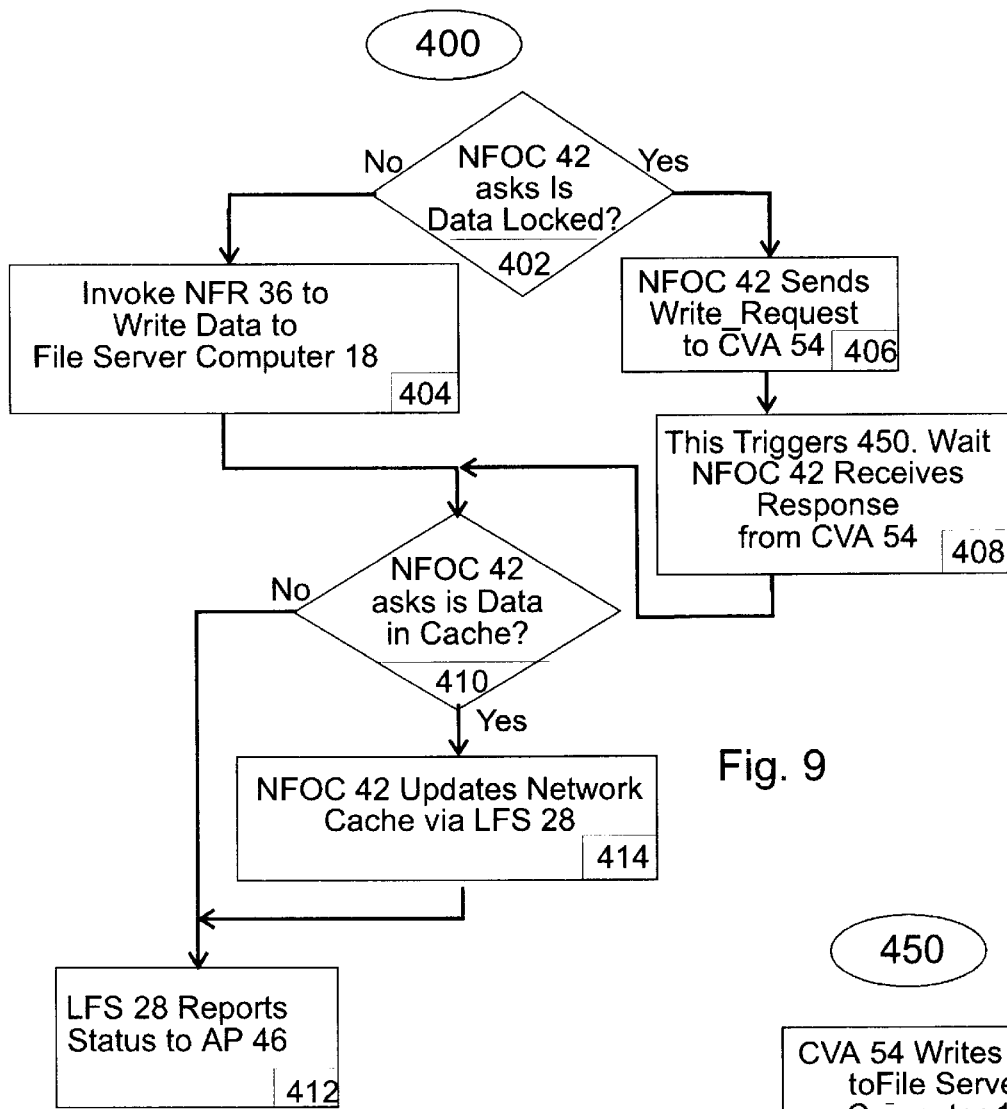
FIG. 9 illustrates a flow chart of the operations of the present invention corresponding to WRITE requests on remote client computer.
Figure 10:
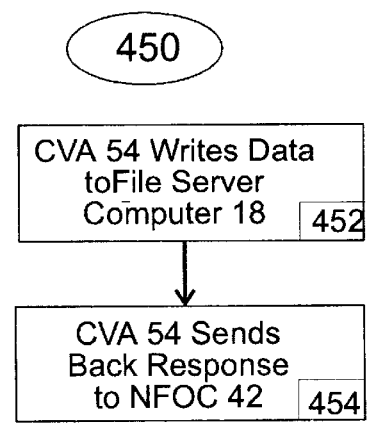
FIG. 10 illustrates a flow chart of the operations of the present invention corresponding to WRITE requests on cache verifying computer.
Figures 13, 14:
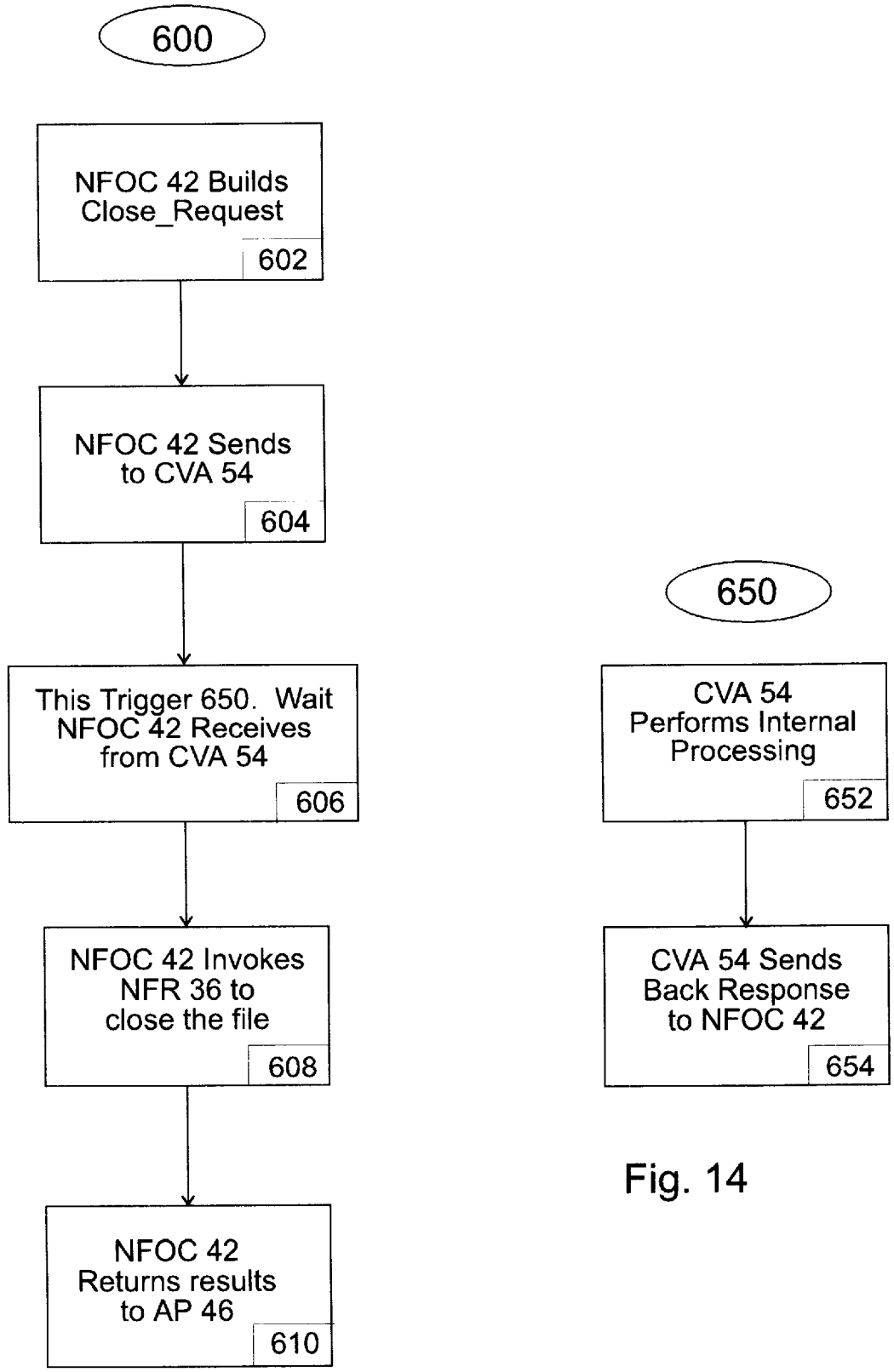
FIG. 13 illustrates a flow chart of the operations of the present invention corresponding to CLOSE requests on remote client computer.
FIG. 14 illustrates a flow chart of the operations of the present invention corresponding to CLOSE requests on cache verifying computer.
Figure 15:
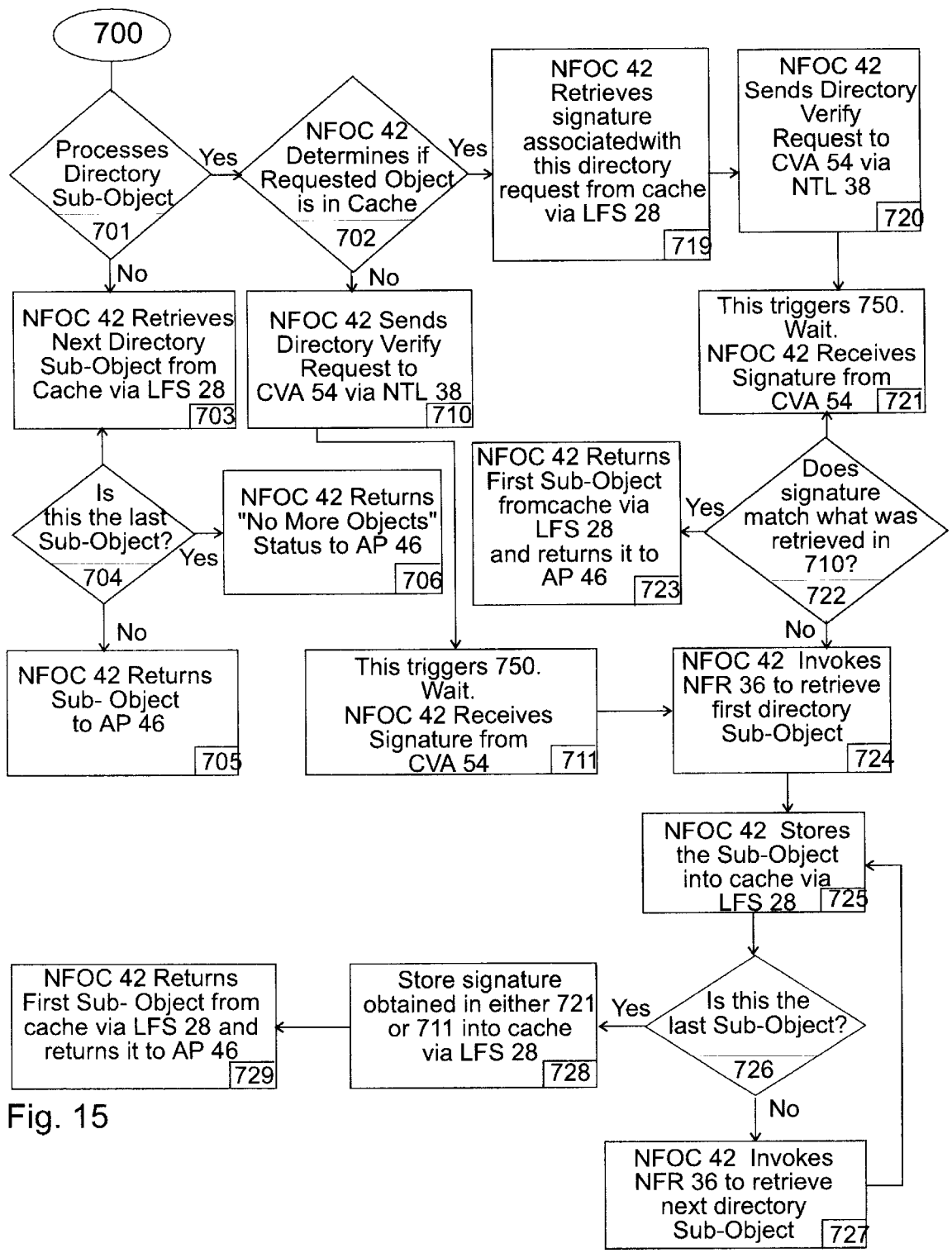
FIG. 15 illustrates a flow chart of the operations of the present invention corresponding to DIRECTORY REQUEST on cache verifying computer.

In the description which follows, the representation of the present invention is in part presented in terms of program operations executed on a file/object oriented distributed network of computers, but may as well be applicable to distributed file/object oriented network systems. The operations are steps leading to a certain result. Typically, these steps take the form of electrical signals which are manipulated, stored, transmitted, combined, compared or otherwise operated upon by a particular computer in the network. For simplicity, these signals may be referred to herein as bits, bytes or data.

The following description describes solutions to the problems associated with a remote client computer's ability to access specified data from a file, an object or directory of a file/object server computer located on a network or world wide web. An apparatus and method are disclosed which permit the remote client computer to reduce the time for accessing such data using a cache verifying computer coupled with a caching technique.

The performance gains realized by the present invention are derived from the fact that remote clients tend to repetitively access the same data by performing file reads or object retrievals. If a copy of the data can be stored in the permanent storage memory of the remote client computer and also verified to be current when it is subsequently retrieved, this will improve performance significantly. This is because it requires much less bandwidth to verify a block of data than it would to actually transfer a block of data. Furthermore when a block of cached data is deemed to be incoherent with the that of the file/object server, the present invention employs a compression mechanism for transmitting the "fresh" block of data to the remote client.

Referring now to the FIGS. 2–22, the present invention is a network computer system 10 having at least one remote client computer 12, cache verifying computer 14, communication server 16 and file/object server computer 18. The cache verifying computer 14 and file/object server computer 18 are connected via a local area network (LAN) link 20. The communication server 16 links the remote client computer 12 to the LAN 20, which in turn permits communication with the cache verifying computer 14 and the file/object server computer 18.

The remote client computer 12 communicates via communication link 22 to the communication server 16. The communication server 16 can be of a type such as that provided by Cisco, 3Com, Shiva, etc., which will act as a router of traffic between the LAN 20 and communication link 22 and convert data through the LAN 20. The LAN 20 can be Ethernet or Token Ring, for example.

The remote client computer 12 has an operating system (OS) 24 with a file system interface (FSI) 26. Operatively connected to the FSI 26 is a local file system (LFS) 28 which in turn is operatively connected to a RAM based disk cacher (RBDC) 30, disk driver (DD) 32 and permanent storage disk (PSD) 34. The PSD 34 includes object retrieval application cache (ORAC) 34a and object collection replicas (OCRs) 34b. A network file redirector (NFR) 36 with prefetch data 37, operatively connects to a network transport layer (NTL) 38 which in turn is connected to a WAN driver 40.

A network file/object cacher (NFOC) 42 is operably disposed between and interconnects the FSI 26 and NFR 36. The NFOC 42 has operatively associated therewith a directory cacher (DC) 43 and directory signature comparator (DSC) 49.

The NTL 38 operatively connects to the NFOC 42. Also, the NFOC 42 operatively connects to the LFS 28. The NFOC 42 includes a block signature generator (BSG) 44 and hit ratio analyzer (HRA) 45, which will be more fully described hereinafter. Aside from the OS 24, there exists on the remote client computer 12 application programs (AP) 46 which employ the OS 24 via FSI 26.

The remote client computer 12 also has object retrieval applications (ORAs) 31 which are operatively connected to an object retrieval/storage interface (ORSI) 27 which is in turn is operatively connected to the object retriever (OR) 39 via the NFOC 42. The OR 39 operatively connects to NTL 28. The NFR 36 operatively connects to a file signature retriever (FSR) 33, wherein the file signature may include the time that the file was last modified, for example. Likewise, the OR 39 operatively connects to an object signature retriever (OSR) 35. The NFOC 42 also has operatively associated therewith a local comparator (LC) 13, a compressor/decompressor (CD) 47, a caching filter (CF) 50, a replication synchronizer (RS) 41 and an object cache evaluator (OCE) 29.

The communication server (CS) 16 includes a WAN driver 48, a LAN driver 50 and routing layer (RL) 52 operatively interconnecting the WAN driver 48 and the LAN 50 driver.

The cache verifying computer 14 includes a cache verifying agent (CVA) 54 having a BSG 56 (of the type described herein), a directory signature generator (DSG) 57 and a comparator 58. The CVA 54 also includes operatively associated therewith CD 51 an object cacher (OC) 59, a replication analyzer (RA) 53 and an associated object retriever (AOR) 55. Also, included is an OS 60 having an FSI 62 operatively connected to CVA 54, an NFR 64 operatively connected to the FSI 62, an NTL 66 operatively connected to the NFR 64 and CVA 54, and a LAN driver 68 operatively connected to the NTL 66. The CVA 54 is also operatively connected to an ORSI 65 which is in turn operatively connected to an OR 61 and in turn to OSR 63. The OR 61 is operatively connected to the NTL 66.

The file/object server computer 18 includes an OS 70 having a file system/object interface (FSOI) 72 which is operatively connected to a local file system/object database (LFOS) 74 which in turn is connected to an RBDC 76, a DD 78 and a PSD 80. The OS 70 includes an NT h 82 operatively connected to a LAN driver 84. A file/object server application (FOSA) 86 exists on the computer 18 which is operably connected to both the NTL 82 and FSI 72. The FOSA 86 includes operatively associated therewith an object signature (ObS) 87.

It should be noted that one skilled in the art can modify the basic network computer to accomplish the objects set forth herein and that such modifications are believed to fall within the scope of the claims appended hereto. Alternatively, for example, the cache verifying agent 54 could reside as part of the communication server 16 or as a stand alone processor with its own memory and operating system. Still, other persons skilled in the art will appreciate the veri lying agent can be implemented in other manners to accomplish the goals set forth herein.

The operation of the system is as follows and as represented in FIGS. 3–22. The operations discussed hereafter assumes connections have been made among all computers 12, 14 and 18 and communication server 16.

On the remote client computer 12, AP 46 makes requests from a file/object server computer 18 wherein the NFOC 42 will intercept a file system call or object retrieval call 100 from the AP 46 or ORA 31 and query whether the data to be acted upon is "remotely located?" 102. If the answer is no, the NFC 42 "instructs" 104 the LFS 28 to handle the data request. If yes, the type of request is ascertained and handled as follows.

In the case of OPEN or CREATE 106 requests, the NFOC 42 follows the operation under 200. The NFOC 42 "invokes" 202 the NFR 36 to process the request. The NFR 36 asks "whether there is a good status" 204 for the request. If no, NFR 36 "returns" 205 the results of the operation to the respective AP 46 or ORA 31.

If yes, NFOC 42 "invokes" 207 CF 15 to "ask" if the data, e.g., objects associated with a file, should be cached based on a set of pre-defined filtering rules and goes to operation 160. CF 15 "assesses" 160 how much time it takes to access data, e.g., an object. CF 15 "determines" 162 "is LAN access available?" If yes, CF 15 "applies" 164 LAN filtering rules. If no, CF 15 "uses" 166 "WAN filtering rules?" From operations 164 and 166 follows operation 168 wherein CF 15 "matches" 168 file/object name against "never cache" set. The "never cache" set is a set of data never to be cached. CF 15 "asks" 170 "is there a match?" If yes, CF 15 "returns" 172 a signal that data should not be cached. If no match, CF 15 "matches" 174 file/object name against LC 13 set. CF 15 "asks" 176 "should" LC 13 be used?" If yes, CF 15 "returns" 178 a signal that LC 13 be employed for the subsequent reads and operation 211 follows. If no, CF 15 "returns" 180 a signal that CVA's 54 comparator 58 be used on subsequent reads and CF 15 "returns" 209 the data to NFR 36 at operation 205.

If yes, CF 15 triggers NFOC 42 to examine the characteristics of the open method and "determine" 211 if the objects associated with this file may be verified with a LC 13. If yes, then NFOC 42 "obtains" 213 the signature by employing either the FSR 33 or OSR 35. Then NFOC 42 "asks" 215 is the data fresh? meaning, for example, "are the objects associated with this file coherent based on the FSR 33. If yes, the NFOC 42 "marks" 221 a handle such that all subsequent read requests which can be satisfied from the cache are deemed coherent based on the LC 13. The results are returned to operation 205.

If no, then all blocks associated with this data, e.g., file, are "removed" 219 from the cache by the NFOC 42 via LFS 28 and the NFR 36 returns 205 the results of the operation to AP 46, for this example.

If "no" was the determination of operation 211, the NFR 36 assigns a handle to the data and the NFOC 42 "builds and sends" 206 an OPEN/CREATE request to CVA 54 via NTL 38 which triggers operation 250.

CVA 54 "opens" 252 a file specified in OPEN/CREATE request via FSI 62, NFR 62 and NTL 66. The CVA 54 asks "whether there is a good status on the file?" 254. If the answer is no, CVA 54 "sends" 256 the bad response back to NFOC 42 in a reverse channel. If the answer is yes, CVA 54 "assigns a handle to the object" 258 and "sends" 260 a good response via a reverse channel.

NFOC 42 via NTL 38 "receives the response" 208 from CVA 54 and "asks for a good status?" 210. If the answer is no, the NFOC 42 "returns the results of the original OPEN/CREATE request" 216 to AP 46. If the answer is yes, then the NFOC 42 "associates 212 the handle assigned by the CVA 54 with the handle returned by the NFR 36 in operation 202. The NFOC 42 "updates" 214 the network file cache via LFS 28 and "returns the results obtained by NFR 36" 216 to AP 46 via FSI 26.

In the case of a READ 108 request, the computer 12 follows the operation 300. Via the FSI 26 and LFS 28, the NFOC 42 "determines if the requested data is in cache?" 302. If the answer is no, a subquery becomes "is the data locked?" 304. To this subquery, if the answer is no, the NFOC 42 "retrieves" 306 the data via NTL 38 from the file/object server computer 18 and the NFOC 42 "updates" 308 the network file cache via L FS 28. If the answer to the subquery is yes, the NFOC 42 via the NTL 38 "sends" 310 a READ request to CVA 54 which triggers 380. CVA 54 via the FSI 62 "reads" 382 the data from the file server computer 18. The CVA 54 "sends" 384 a response back to NFOC 42, wherein the data is "received" 312 and "updated" 308 as described above. The retrieved data is "returned" 314 by the NFOC 42 to AP 46.

If the data is in cache, NFOC 42 "asks" 301 should the verify be done using the LC 13. The answer to this was established based on whether or not 221 had been invoked during the OPEN operation. If the answer is yes, then NFOC 42 "invokes" 213 LC 13.

If the answer is no, NFOC 42 is triggered to "invoke" 316 the BSG 44 to generate a signature of data. NFOC 42 via NFR 36 and NTL 38 "sends" 320 a VERIFY request having the first signature of data therein to CVA 54 which triggers 350.

CVA 54 via FSI 62 "reads" 352 data from the file server computer 18. CVA 54 "invokes" 354 BSG 56 to generate a second signature of data. CVA 54 "invokes" 356 comparator 58 to compare the first and second signatures of data and "asks whether there is a match?" 358. If the answer is no, CVA 54 "asks if data is locked?" 360. If no, the CVA 54

"sends" 362 back a bad response to NFOC 42 via a reverse channel. If yes, CVA 54 "sends" 364 back a bad response to NFOC 42 along with read data via a reverse channel. If there is a match of the signatures, CVA 54 "sends" 366 a good response back to NFOC 42 via NTL 66.

The NFOC 42 receives 322 the response from CVA 54 and asks "is the data valid?" 324. If no, NFOC 42 asks "is the data locked?" 326. If not locked, the NFOC 42 retrieves data 306 as described above. If locked, data will have been "returned" 328 for updating per 308. If the data was valid, NFOC 42 returns the data to AP 46.

In the case of a WRITE 110 request, the computer 12 follows the operation 400. The NFOC 42 "asks is the data locked?" 402. If no, the NFR 36 is invoked to "write" 404 to the file server computer 18. If the data is locked, NFOC 42 via NTL 38 "sends" 406 a WRITE request to CVA 54 which triggers 450. CVA 54 "writes" 452 data to file server computer 18 via FSI 62. CVA 54 "sends" 454 back a response to NFOC 42 which "receives" 408 the response. The NFOC 42 "asks is the data in cache?" 410. If no, LFS 28 "reports status" 412 to AP 46. If yes, NFOC 42 "updates" 414 network cache via LFS 28 and "reports status" 412 to AP 46.

In the case of LOCK/UNLOCK 112 request, operation 500 is employed. The NFOC 42 "builds" 502 an LOCK/UNLOCK request. The NFOC 42 via NTL 38 "sends" 504 the LOCK/UNLOCK request to CVA 54 which triggers operation 550. CVA 54 "sends" 552 an LOCK/UNLOCK request to the file server computer 18 via FSI 62. CVA 54 "sends" 554 a response back to NFOC 42 via a reverse channel. The NFOC 42 "receives" 506 the response and "returns" 508 the results to AP 46.

In the case of a CLOSE 114 request, operation 600 is employed. The NFOC 42 "builds" 602 a CLOSE request. The NFOC 42 via NTL 38 "sends" 604 the CLOSE request to CVA 54 which triggers operation 650. CVA 54 "performs" 652 internal processing of the request. CVA 54 "sends" 654 a response back to NFOC 42. The NFOC 42 "receives" 606 the response and invokes the NFR 36 to "close" 608 the file and "return" 610 the results to AP 46.

In the case of a DIRECTORY REQUEST 115, operation 700 is employed. Here, the NFOC 42 "processes" 701 a first directory sub-object request.

If the sub-object is not a first, NFOC 42 "retrieves" 703 the next directory sub-object from cache via LFS 28. NFOC 42 "asks" 704 whether this is the last sub-object from cache via LFS 28? If no, NFC "returns" 705 a sub-object to AP 46. If yes and it is the last sub-object, NFOC 42 "returns" 706 a "no more objects" status to AP 46.

Figure 16:
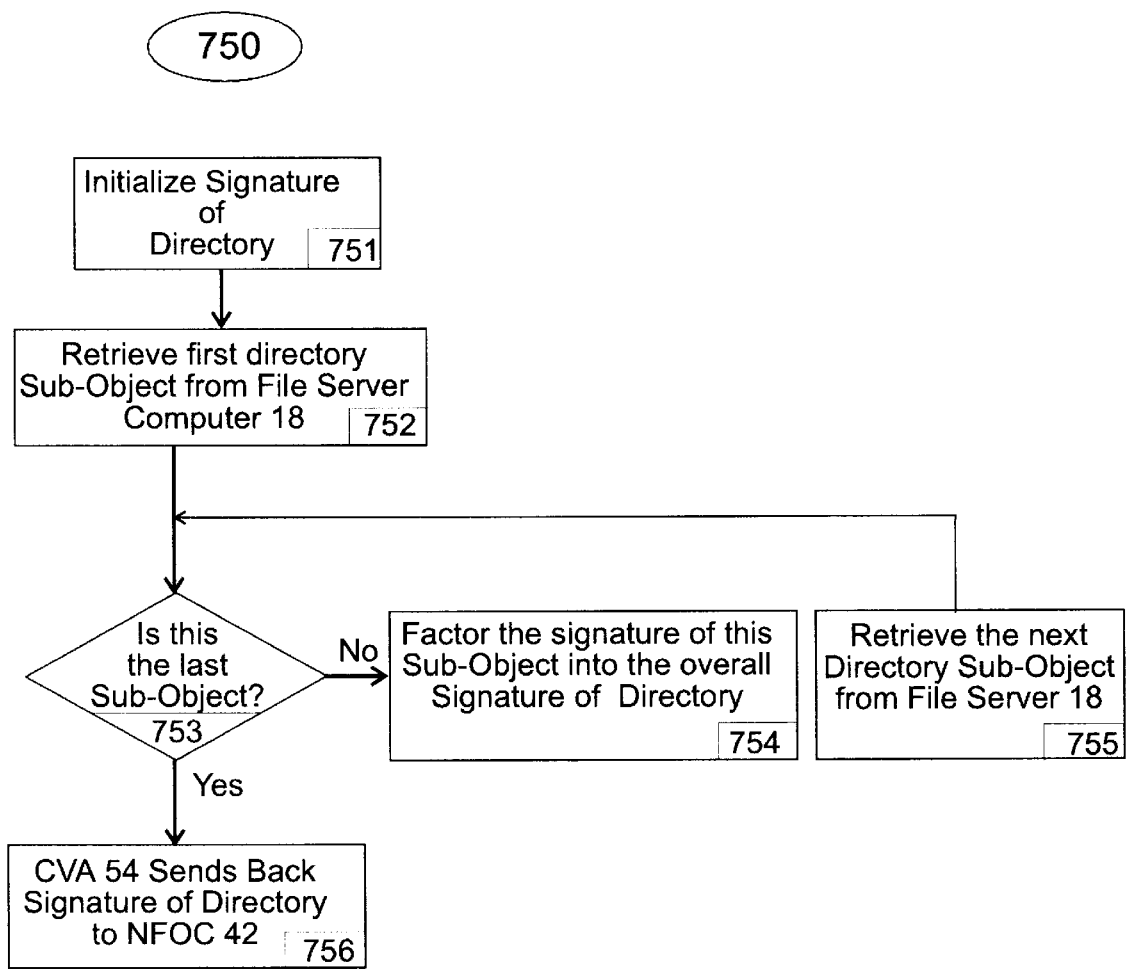
FIG. 16 illustrates a flow chart of the operations of the present invention corresponding to a part of the operations in FIG. 15.
Figure 17:
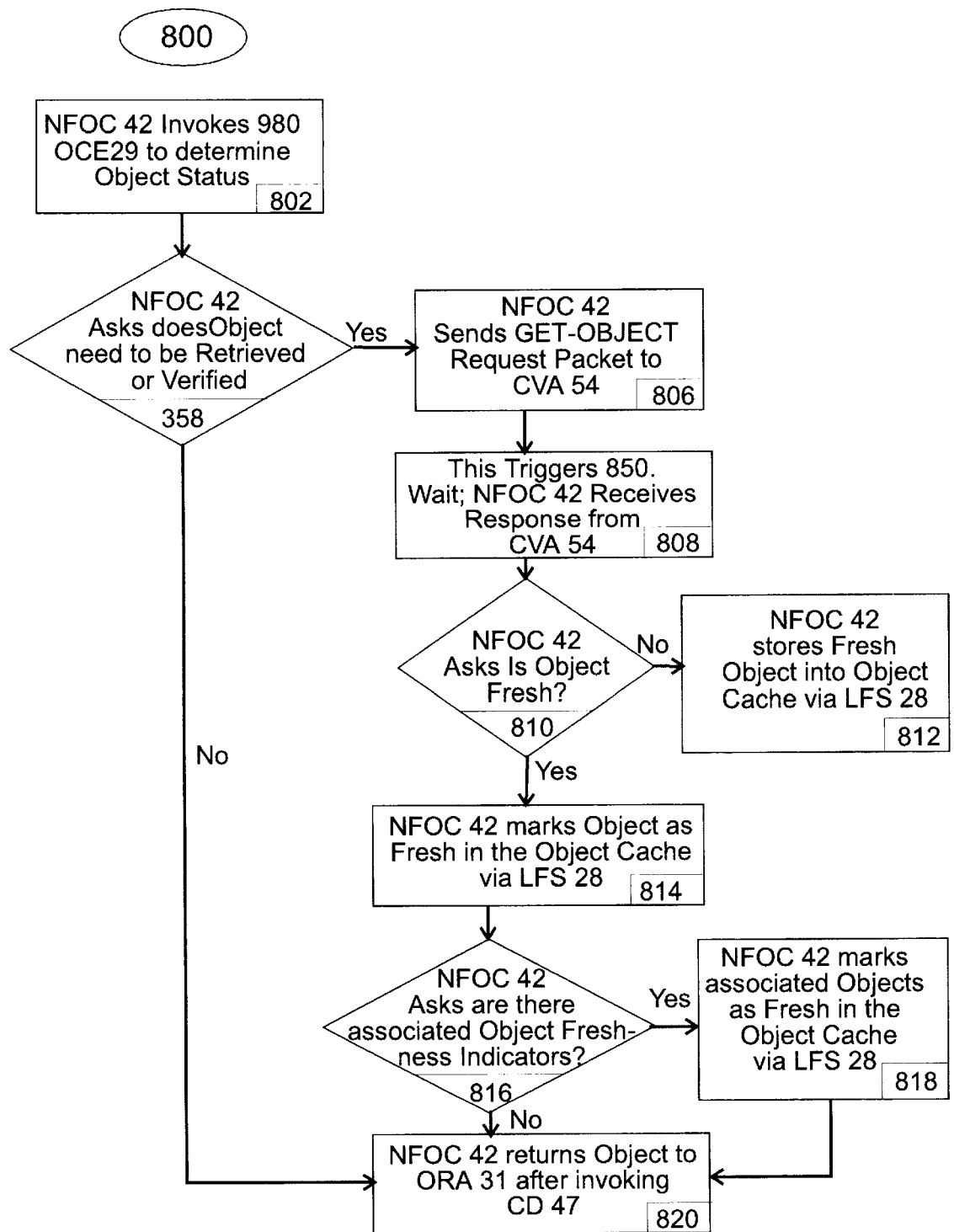
FIG. 17 illustrates a flow chart of the operations of the present invention corresponding to GET-OBJECT REQUEST on the remote client computer.
Figure 18:
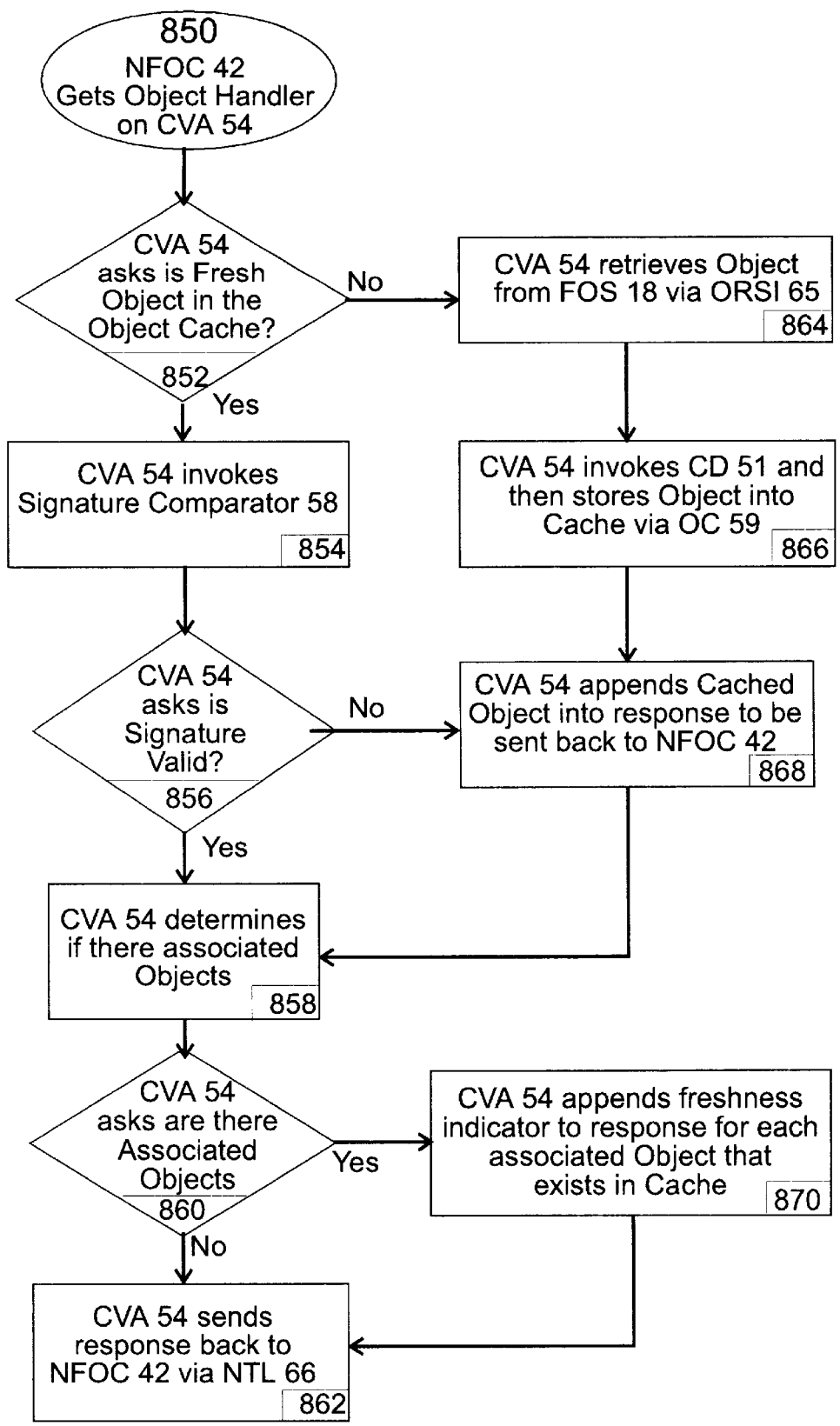
FIG. 18 illustrates a flow chart of the operations of the present invention corresponding to GET-OBJECT REQUEST on the cache verifying computer.
Figure 19:
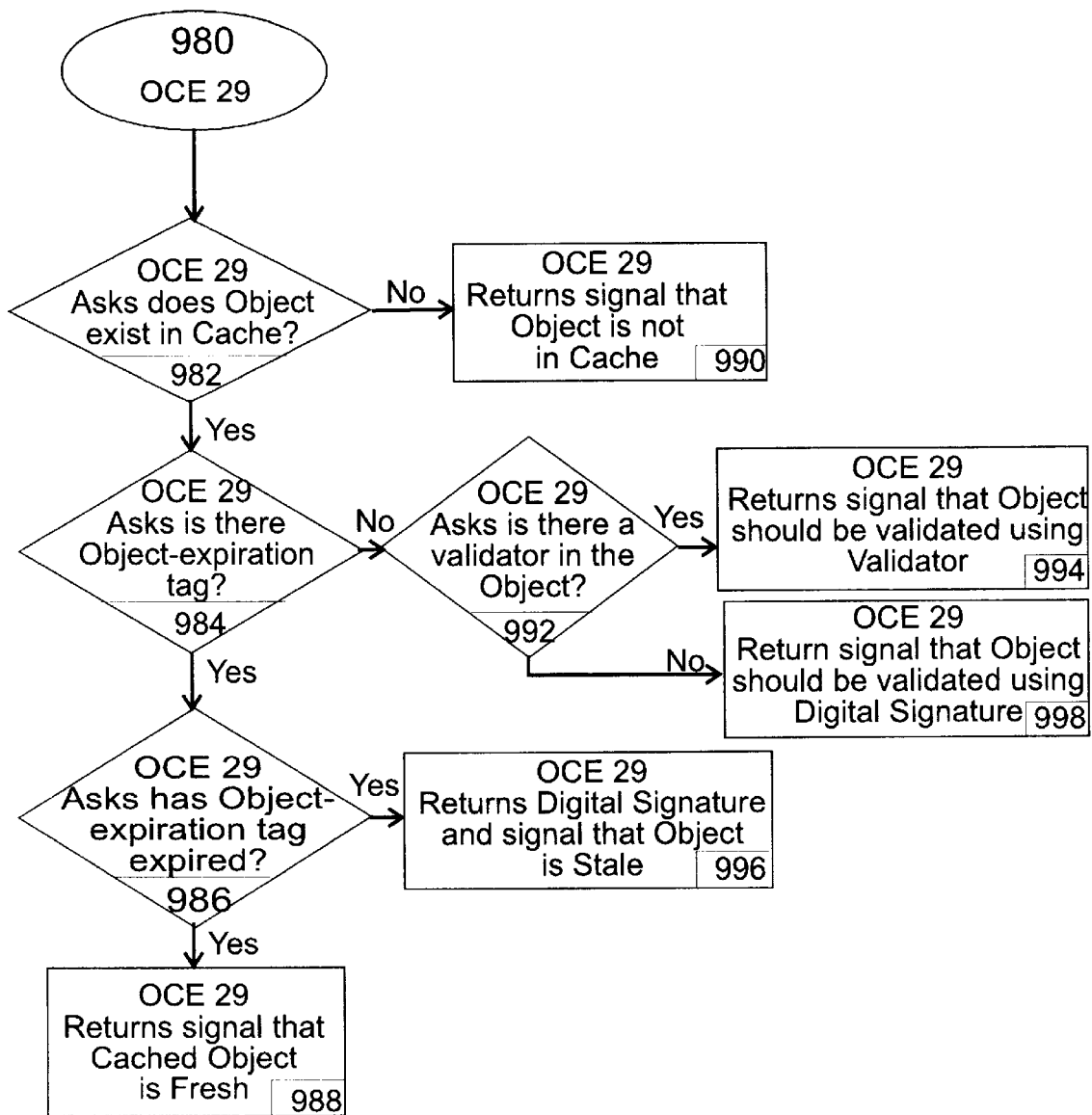
FIG. 19 illustrates a flow chart of the operations of the present invention corresponding to a object cache evaluator.
Figure 20:
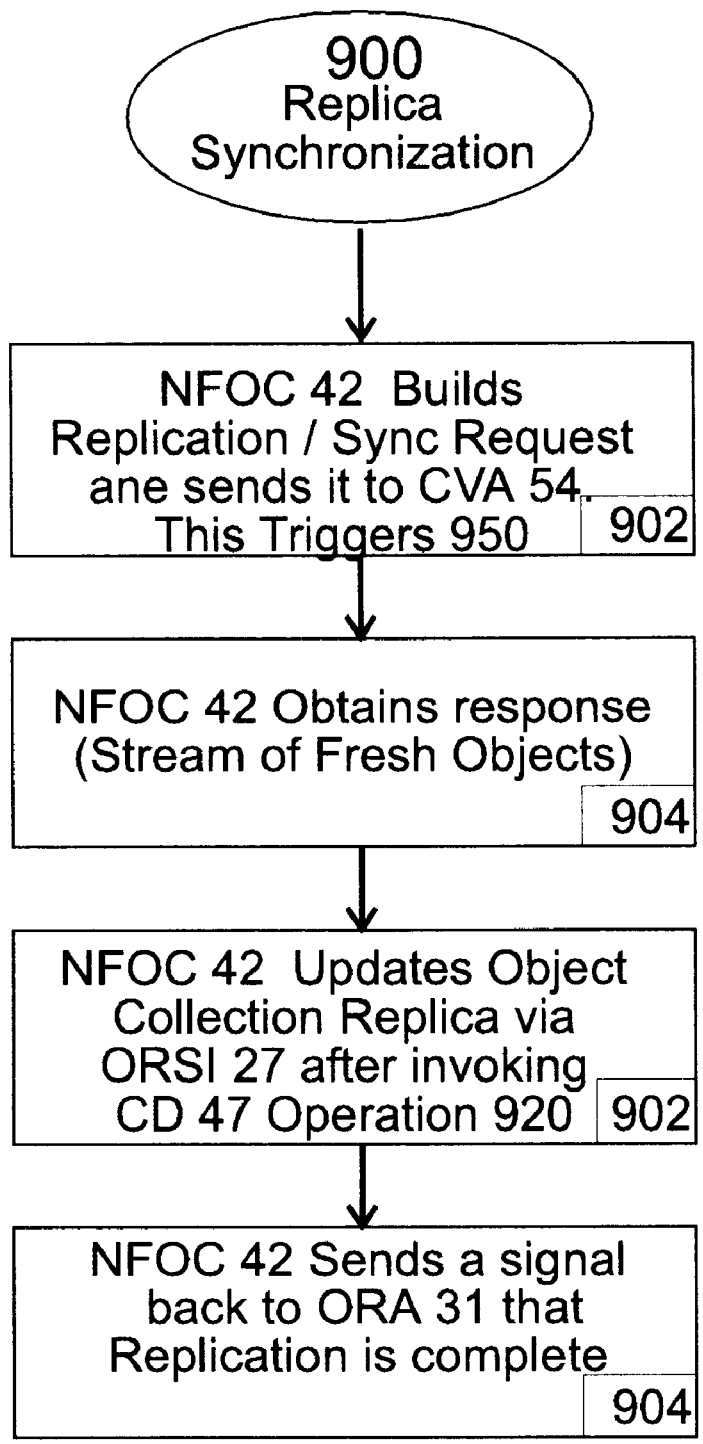
FIG. 20 illustrates a flow chart of the operations of the present invention corresponding to a REPLICATE-SYNCHRONIZATION request on the remote client computer.
Figure 21:
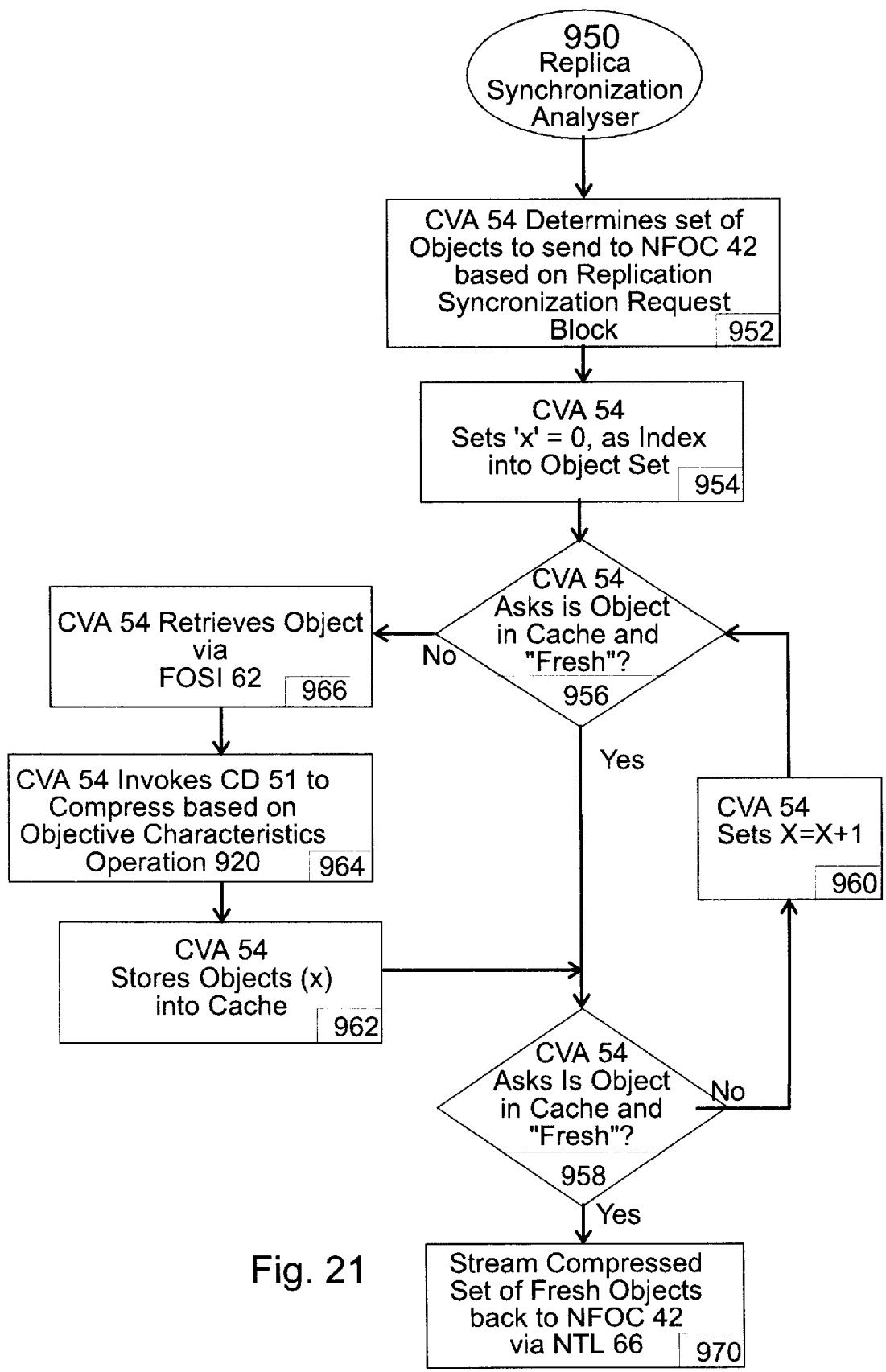
FIG. 21 illustrates a flow chart of the operations of the present invention corresponding to a REPLICATE-SYNCHRONIZATION request on the cache verifying computer.
Figure 22:
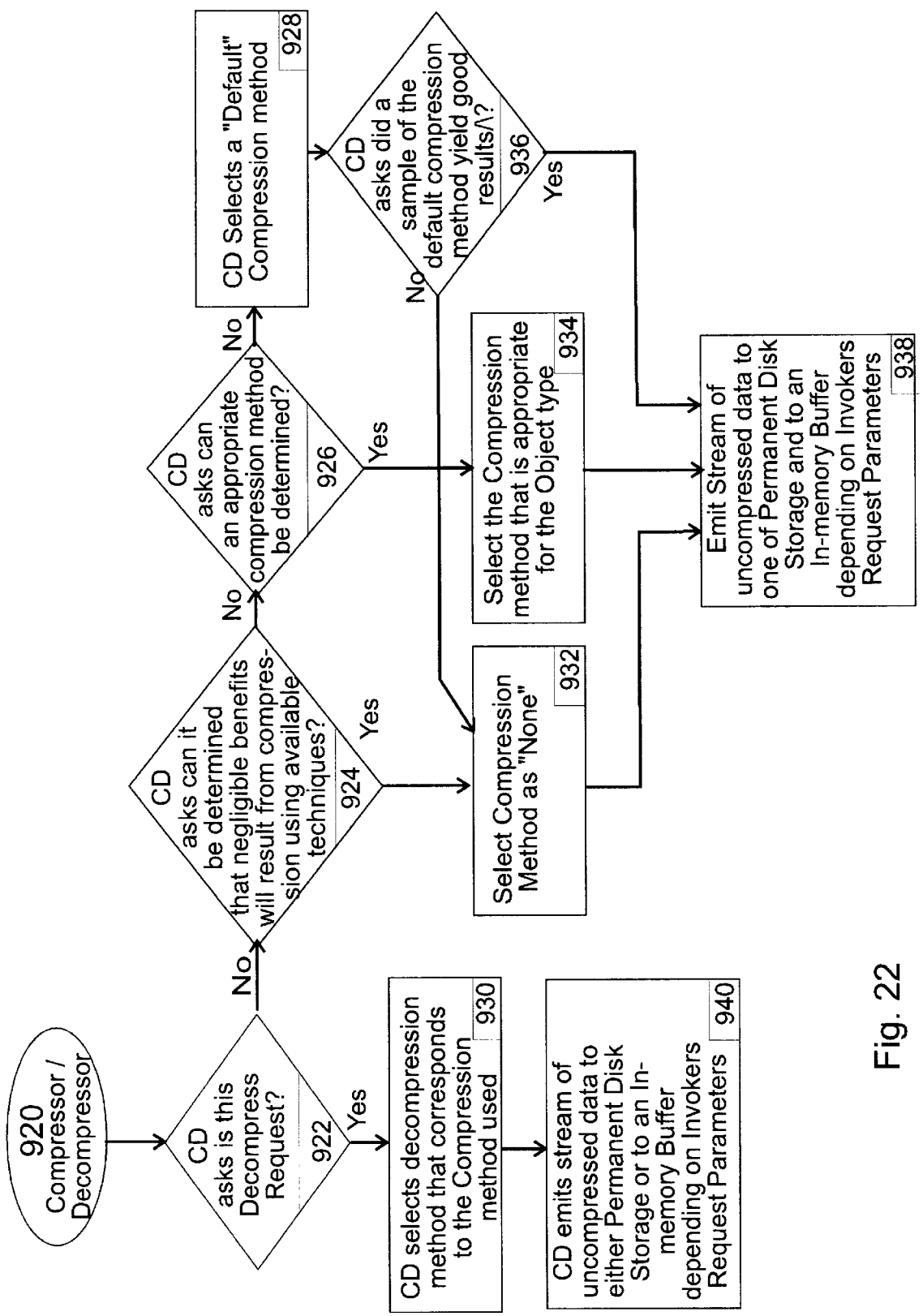
FIG. 22 illustrates a flow chart of the operations of the present invention corresponding to a compression/decompression unit.

If the sub-object is the first directory sub-object, the NFOC 42 "determines" if the requested object is in cache 702. If no, the NFOC 42 "sends" 710 a directory verify request to CVA 54 via NTL 38. This triggers the steps 750 and NFOC 42 waits to "receive" 711 signature from CVA 54. As seen in FIG. 16, the steps 750 are performed by the CVA 54. Particularly, the DSG 57 "initializes" 751 signature of a directory. The DSG 57 "retrieves" 752 the first directory sub-object from the FS 18 via NTL 66. The DSG 57 "asks" 753 is this the last sub-object? If no, DSG 57 "factors" 754 the signature of this sub-object into the overall signature of the directory. The DSG 57 then "retrieves" 755 the next sub-object from FS 18 and returns to step 753. If the last sub-object, CVA 54 "sends" 756 back signature of directory to NFOC 42 at block 724 and proceeds therefrom.

If yes and in cache, the NFOC 42 "retrieves" 719 signature associated with this directory request from cache via LFS 28. NFOC 42 "sends" 720 directory verify request to CVA 54 via NTL 38. This triggers the steps 750 wherein NFOC 42 waits and "receives" 721 signature from CVA 54. NFOC 42 "invokes" 722 DSC 46 to compare whether signature matches the retrieved signature in 719? If yes and the signatures match, NFOC 42 "returns" 723 the first sub-object from cache via LFS 28 and returns it to AP 46. If no and the signature does not match, NFOC 42 "invokes" 724 NFR 36 to retrieve the first directory sub-object. NFOC 42 "stores" 725 the sub-object into cache via LFS 28. NFOC 42 "asks" 726 whether this is the last sub-object? If no and it is not the last sub-object, NFOC 42 invokes NFR 36 to "retrieve" the next directory sub-object and returns to step 725. If yes and it is the last sub-object, NFOC 42 "stores" 728 the signature obtained via 721 or 711 into cache via LFS 28. NFOC 42 "returns" 729 first sub-object from cache via LFS 28 and returns the same to AP 46.

In the case of a GET-OBJECT REQUEST 116 operation 800 is employed. The NFOC 42 invokes OCE 29 to perform operation 980 to determine object status. OCE 29 "asks" 982 "does object exist in cache? If no, OCE 29 "returns" 990 a signal that object is not in cache. If yes, OCE 29 "asks" 984 "is there an object expiration tag?"

If yes and there is a object expriation tag, OCE 29 "asks" 986 "has object expiration tag expired?" If yes, OCE "returns" 996 a digital signature and signal that object is stale. If no, OCE 29 "returns" 988 signal that cached object is fresh.

If no and there is a object expiration tag, OCE 29 "asks" 992 "is there a validator in the object?" If yes, OCE 29 "returns" 994 a signal that object should be validated using validator. If no, OCE 29 "returns" 998 a signal that object should be validated using digital signature.

Once object status has been determined via 802, NFOC 42 "asks" 358 "does object need to be retrieved or verified?" If yes, NFOC 42 "sends" 806 a Get-Object request packet to CVA 54. This triggers operation 850 and NFOC 42 waits for response from CVA 54.

The operations 850 et seq. are as follows. NFOC 42 "gets" 850 an object handler on CVA 54. CVA 54 "asks" 852 is there a fresh object in the object cache? If yes, CVA 54 "invokes" 854 signature comparator 58. CVA 54 "asks" 856 is the signature valid? If yes, CVA 54 "determines" 858 if there are associated objects. If no, CVA 54 "appends" 868 the cached object into a signal response to be sent back to NFOC 42 and then returns to the operations 858 and those following.

If the answer to operation 852 is no, the CVA 54 "retrieves" 864 an object from FOS 18 via ORSI 65. CVA 54 "invokes" 866 CD 51 and then stores the object into cache via OC 59 and goes to operations 868 and those which follow.

From operation 858, CVA 54 "asks" 860 are there associated objects? If yes, CVA "appends" 870 freshness indicator to a response signal for each associated object that exists in cache. CVA 54 then "sends" 862 a response signal back to NFOC 42 via NTL 66. If the answer to operation 860 was no, the operation 862 follows.

NFOC 42 "asks" 810 "is the object fresh?" If no, NFOC 42 "stores" 812 fresh object into object cache via LFS 28. If yes, NFOC 42 "asks" 816 "are there associated object freshness indicators?" If yes, NFOC 42 "marks" 818 associated objects as fresh in the object cache via LFS 28. If no, NFOC 42 invokes CD 47 and "returns" 820 the object to ORA 31. If the answer to operation 358 is no, the NFOC 42 invokes CD 47 and "returns" 820 the object to ORA 31.

In the case of a REPLICATION-SYNCHRONIZE REQUEST operation 900 is employed. NFOC 42 "builds" 902 a Replication-Synchronize request and "sends" the request to CVA 54 which triggers operation 950.

CVA 54 "determines" 952 a set of objects to send to NFOC 42 based upon the Replication-Synchronize request. CVA 54 "sets" 954 "x"=0 as index into an object set. CVA 54 "asks" 956 "is the object in cache and fresh?" If no, CVA 54 "retrieves" 966 the object via FOSI 62. CVA 54 "invokes" 964 CD 51 to compress based ob objective characteristics. CVA 54 "stores" 962 objects (x) into cache. CVA 54 "asks" 958 "is the object in cache and fresh?" If no, CVA 54 "sets" 960 "x=x+1" and returns to operation 956. If the answer to operation 956 and 958 is yes, CVA 54 "streams" 970 compressed set of fresh objects back to NFOC 42 via NTL.

NFOC 42 "obtains" 904 stream of fresh objects response from CVA 54. NFOC 42 "invokes" CD 47 and updates object collection replica via ORSI 27. NFOC 42 "sends" 904 a signal back to ORA 31 that replication is complete.

When CD 47 or CD 51 (either referred to as CD in this paragraph) is invoked, the operations under 920 are performed. CD "asks" 922 "is this a decompress request?" If no, CD "asks" 924 "can it be determined that negligible benefits will result from compression using available techniques? If no, CD "asks" 926 "can an appropriate compression method be determined?" If no, CD "selects" 928 a default compression method. CD "asks" 936 "did a sample of the default compression method yield good results? If no, CD "selects" 932 compression method as none. If the results of 936 are good, CD "emits" 938 a stream of uncompressed data to one of permanent disk storage and to an in-memory buffer depending on invokers request parameters. If the answer to operation 924 was yes, then operations 932 and 938 are followed. If the answer to operation 926 is yes, CD "selects" 934 the compression method that is appropriate for the object type and operation 938 follows. If the answer to operation 922 is yes, CD "selects" 930 a decompression method that corresponds to the compression method used. CD "emits" 940 a stream of uncompressed data to one of permanent disk storage and to an in-memory buffer depending on invokers request parameters.

By way of example, the following packet formats define this client server protocol:

```
//
TYPE DEFINITIONS
    BYTE => an 8 bit value (octet) unsigned
    DWORD => a 16 bit value in which network byte ordering is not important
    WORD => 32 bit value in which network byte ordering is not important
    MDWORD => 32 bit value in which network byte ordering is important and represented
        using "motorola or big endian" format
// START CONNECTION REQUEST
    typedef struct {
        BYTE bFunctionCode; // always 0x00
        BYTE bResv; //
        WORD wSequenceValue; //
}CVP_START_CONNECTION_REQ, *pCVP_START_CONNECTION_REQ;
// START CONNECTION RESPONSE
    typedef struct {
    BYTE bFunctionCode;        // always 0x80
    BYTE bStatus;        //
    WORD wSequenceValue // Same value as in request
    DWORD dConnectionHandle; //
}CVP_START_CONNECTION_RSP, *pCVP_START_CONNECTION_RSP;
// END CONNECTION REQUEST
    typedef struct }
    BYTE bFunctioncode; //always 0x01
    BYTE bResv;        //
    WORD wSequencevalue; //
    DWORD dConnectionHandle; //
    // as returned on start connection
}CVP_END_CONNECTION_REQ, *CVP_END_CONNECTION_REQ;
//END CONNECTION RESPONSE
    typedef struct {
    BYTE bFunctionCode; //always 0x81
    BYTE bStatus;        //
    WORD wSequencevalue; // Same value as in request
}CVP_END_CONNECTION_RSP, *pCVP_END_CONNECTION_RSP;
//OPEN OR CREATE FILE REQUEST
    typedef struct {
    BYTE bfunctioncode; // always 0x02
    BYTE bResv; //
    WORD wSequenceValue; //
    DWORD dConnectionHandle; // As returned on START_CONNECT
    MDWORD dFileAttributesMask; //
    BYTE zFilePath[512]; //null terminated file name
}CVP_OPEN_OR_CREATE_FILE_REQ, *pCVP_OPEN_OR_CREATE_FILE_REQ;
//OPEN OR OR CREATE FILE RESPONSE
    typedef struct {
    BYTE bFunctionCode; // always 0x82
    BYTE bStatus;        //
    WORD wSequenceValue; // Same value as in request
    DWORD dVerifiersFileHandle; //
}CVP_OPEN_OR_CREATE_FILE_RSP, *pCVP_OPEN_OR_CREATE_FILE_RSP;
//CLOSE FILE REQUEST
```

-continued

```
    typedef struct {
    BYTE bFunctionCode; // always 0x03
    BYTE bResv;        //
    WORD wSequenceValue; //
    DWORD dConnectionHandle; // As returned on START_CONNECT
    DWORD dVerifiersFileHandle; // As returned on OPEN_OR_CREATE
}CVP_CLOSE_FILE_REQ, *pCVP_CLOSE_FILE_REQ;
//CLOSE FILE RESPONSE
typedef struct {
    BYTE bFunctionCode; // always 0x83
    BYTE bStatus; //
    WORD wSequenceValue; // Same value as in request
}CVP_CLOSE_FILE_RSP, *pCVP_CLOSE_FILE_RSP;
//LOCK REGION REQUEST
    typedef struct {
    BYTE bFunctionCode; // always 0x04
    BYTE bResv; //
    WORD wSequenceValue; //
    DWORD dConnectionHandle; // As returned on START_CONNECT
    DWORD dVerifiersFileHandle; // As returned on OPEN_OR_CREATE
    MDWORD dSeekValue;   //offset into file
    MDWORD dLength;   //number of bytes to lock
}CVP_LOCK_REGION_REQ, *pCVP_LOCK_REGION_REQ;
//LOCK REGION RESPONSE
    typedef struct {
    BYTE bFunctionCode;   // always 0x84
    BYTE bStatus;   //
    WORD wSequenceValue; // Same value as in request
    DWORD     dVerifiersLockHandle;
} CVP_LOCK_REGION_RSP, *pCVP_LOCK_REGION_RSP;
//UNLOCK REGION REQUEST
    typedef struct {
    BYTE bFunctionCode; // always 0x05
    BYTE bResv;//
    WORD wSequenceValue;   //
    DWORD dConnectionHandle; // As returned on START_CONNECT
    DWORD dVerifiersLockHandle; // As returned LOCK REGION
} CVP_UNLOCK_REGION_REQ, *pCVP_UNLOCK_REGION_REQ;
// UNLOCK REGION RESPONSE
    typedef struct {
    BYTE bFunctionCode;   // always 0x85
    BYTE bStatus;
    WORD wSequenceValue;   // Same value as in request
}CVP_UNLOCK_REGION_RSP *pCVP_UNLOCK_REGION_RSP;
//VERIFY REGION REQUEST
    typedef struct {
    BYTE bFunctionCode; // always 0x06
    BYTE bResv;      // if status is not 0xF1
    WORD wSequenceValue; //
    DWORD dConnectionHandle; // As returned on START_CONNECT
    DWORD dVerifiersFileHandle; // As returned on OPEN_OR_CREATE
    MDWORD dSeekValue; // offset into file
    MDWORD dLength; // number of bytes to verify
    BYTE Signature[8]; //CRC adaptation
} CVP_VERIFY_RFGION_REQ, *pCVP_VERIFY_REGION_REQ;
//VERIFY REGION RESPONSE #1 (not locked data)
    typedef struct {
    BYTE bFunctionCode; // always 0x86
    BYTE bStatus;      //
    WORD wSequenceValue;   // Same value as in request
} CVP_VERIFY_REGION_RSP, *pCVP_VERIFY_REGION_RSP;
//
//VERIFY REGION RESPONSE #2
// (if signatures did not match and region was locked)
//
    typedef struct {
    BYTE bFunctionCode; // always 0x86
    BYTE bStatus;      //status = 0xF1 for this case
    WORD wSequenceValue; // Same value as in request
    MDWORD dLength;      // # of bytes that follow
    char TheData[ ];        //
} CVP_VERIFY_REGION_RSP, *pCVP_VERIFY_REGION_RSP;
// READ REGION REQUEST
// (sent only when reading from a locked region)
    typedef struct {
    BYTE bFunctionCode; // always 0x07
    BYTE bResv,       //
    WORD wSequenceValue; //
    DWORD dConnectionHandle; // As returned on START_CONNECT
    DWORD dVerifiersFileHandle; // As returned on OPEN_OR_CREATE
```

```
        MDWORD dSeekValue; // offset into file
        WDWORD dLength;      // number of bytes to read
} CVP_READ_REGION_REQ, *pCVP_READ_REGION_REQ;
//
// READ REGION RESPONSE
//
        typedef struct {
        BYTE bFunctionCode; // always 0x87
        BYTE bStatus;      // status 0xF1 for this case
        WORD wSequenceValue; // Same value as in request
        MDWORD dLength; // # of bytes that follow
        char TheData[ ];   //
} CVP_READ_REGION_RSP, *pCVP_READ_REGION_RSP;
//
// WRITE REGION REQUEST
// (sent only for when writing to a looked region)
//
        typedef struct {
        BYTE bFunctionCode; // always 0x08
        BYTE bResv; //
        WORD wSequenceValue; //
        DWORD dConnectionHandle; // As returned on START_CONNECT
        DWORD dverifiersFileHandle; // As returned on OPEN_OR_CREATE
        MDWORD dSeekValue; // offset into file
        MDWORD dLength; // number of bytes to write
        BYTE TheData [ ];  // data to be written
} CVP_WRITE_REGION_REQ, *pCVP_WRITE_REGION_REQ;
// WRITE REGION RESPONSE
        typedef struct {
        BYTE bFunctionCode; // always 0x88
        BYTE bStatus;      // status
        WORD wSequenceValue; // Same value as in request
        DWORD dLength; // # of bytes written
} CVP_WRITE_REGION_RSP *pCVP_WRITE_REGION_RSP;
//
// VERIFY DIRECTORY REQUEST
//
typedef struct {
BYTE bFunctionCode;          // always 0x0A
BYTE bResv;            //
WORD wSequenceValue;        //
DWORD dConnectionHandle;       // As returned on START_CONNECT
MDWORD wFilesInDirectoryCount; //
MDWORD dAttributeMask;         // 0x00000001 = read only file
                // 0x00000002 = hidden file
        // 0x00000004 = system file
        // 0x00000008 = volume label
        // 0x00000010 = directory
        // 0x00000020 = changed and not archived
    BYTE   Signature[8];      //
    BYTE   zSearchPath[512];    // null terminated file name
} CVP_VERIFY_DIRECTORY_REQ, *pCVP_VERIFY_DIRECTORY_REQ;
// VERIFY DIRECTORY RESPONSE RESPONSE
typedef struct {
    BYTE   bFunctionCode;       // always 0x8A
    BYTE   bStatus;      //
    WORD   wSequenceValue;      // Same value as in request
    BYTE   Signature[8];      //
} CVP_VERIFY_DIRECTORY_RSP, *pCVP_VERIFY_DIRECTORY_RSP;
//
// GET OBJECT REQUEST HEADER
//
typedef struct {
    BYTE   bFunctionCHSe;       // always 0x48
    BYTE   bResv;         //
    DWORD  dMessageLen;
    DWORD  wSequenceValue;      //
    DWORD  dConnectionHandle;     //
    DWORD  dVerifiersDbHandle;    // 0 for Web Objects
#define HAPPROT_HTTP          1    // 1 = HTTP type get request
#define HAPPROT_LOTUSNOTES    2    // 2 = Lotus Notes type Get request
    BYTE   bProtocol;
    BYTE   bCommandBlockCount;    // Number of GetObject command blocks which follow
} HAP_GET_OBJECT_REQHDR, *pHAP_GET_OBJECT_REQHDR;
//
// GET OBJECT REQUEST
//
typedef struct {
    HAP_GET_OBJECT_REQHDR Hdr;  // fixed header
    BYTE   FirstCommandBlock[1];
```

```
        BYTE    sMd5Signature[16];  // if packet signatures required
} HAP_GET_OBJECT_REQ, *pHAP_GET_OBJECT_REQ;
//
// GET OBJECT COMMAND BLK HEADER
//
typedef struct {
    MDWORD  dLength;  // Length of command block
    #define GETOBJCMD_F_GETOBJECT      0x01    // 1=Get Object
    #define GETOBJCMD_F_GETOBJECT_EMB  0x02    // 2=Get Object and Embedded Objects
    #define GETOBJCMD_F_VEROBJECT      0x04    // 4=Verify Object
            // if 0x01 also on the retrieve object
#define GETOBJCMD_F_GETDIROBJECT 0x08 // 8=Get directory object
#define GETOBJCMD_F_VERDIROBJECT 0x10 // 10=Verify Dir Object
            // if 0x08 also on the retrieve object
#define GETOBJCMD_F_REPLDB 0x20      // 20=Replicate Data Base
    WORD   wFunction; // Function of command block
#define GETOBJCMD_M_OPENFLAGS_INC    0x01   // 0x01 = Object open flags included
#define GETOBJCMD_M_COMPSLOT_INC     0x02   // 0x02 = Compression Slot Follows
#define GETOBJCMD_M_OBJNAME_INC      0x04   // 0x04 = Object Name Follows
#define GETOBJCMD_M_PAYLOAD_INC 0x08 // 0x08 = Payload included in command
#define GETOBJCMD_M_VERINFO_INC      0x10   // 0x10 = Verification Info Follows
#define GETOBJCMD_M_REPLINFO_INC     0x20   // 0x20 = Verification Info Follows
    WORD   wMask;           // Additional info for command block
}
HAP_GET_OBJECT_COMMAND_BLOCKHDR,*pHAP_GET_OBJECT_COMMAND_BLOCKHDR;
//Same as Lotus' TIMEDATE struct, this frees this file from
//dependencies on their include files
typedef struct {
    DWORD  Innards[2];
} HAP_TGTIMEDATE, *pHAP_TGTIMEDATE;
typedef struct {
    HAP_TGTIMEDATE    TimeDate;
    DWORD             dFirstNoteID;
}HAP_REPLICATE,*pHAP_REPLICATE;
//
// GET OBJECT COMMAND BLK
//
typedef struct {
    HAP_GET_OBJECT_COMMAND_BLOCKHDR Hdr;    // Fixed Header
    MWORD   wOpenFlags;             // (if bMask|=0x02)
    MWORD   wSlot;                  // Compression slot (if bMask|=0x01)
    BYTE    sObjectName[1];         // (if bMask|=0x04) Variable Length
    DWORD   dPayloadLen;            // (if bMask|= 0x04) Length of Payload
    BYTE    UserData[1];            // (if bMask|= 0x04) Payload, Variable Length
#define GETOBJCMD_VST_32FCS          // 1=32 bit FCS of object payload
#define GETOBJCMD_VST_LNSEQ    2     // 2=Lotus Notes Sequence #
#define GETOBJCMD_VST_WLMD     3     // 3=Web Last Modified Dates
#define GETOBJCMD_VST_WET      4     // 4=Web Entity Tags
    BYTE   bVerifierSignatureType;  // (if bMask|= 0x08)
    MWORD  wVerifierSignatureLength;     // (if bMask|= 0x08)
    BYTE   sVerifierSignature[1];   // (if bMask|= 0x08) Signature, Variable Length
    HAP_REPLICATE ReplicateInfo;         // replication info structure
} HAP_GET_OBJECT_COMMAND_BLOCK,*pHAP_GET_OBJECT_COMMAND_BLOCK;
//
// GET OBJECT RESPONSE HEADER
//
typedef struct {
    BYTE    bFunctionCHSe;       // always 0xC8
    BYTE    bStatus;       //
    DWORD   dMessageLen;
    WORD    wSequenceValue;      // corresponds to original request
    DWORD   dConnectionHandle;   //
    WORD    dVerifiersDbHandle;  // 0 for Web Objects
    BYTE    bProtocol;
BYTE   bResponseBlockCount;   // Number of GetObject response blocks
            // which follow
} HAP_GET_OBJECT_RSPHDR, *pHAP_GET_OBJECT_RSPHDR;
//
// GET OBJECT RESPONSE
//
typedef struct {
HAP_GET_OBJECT_RSPHDR Hdr;   // fixed header
BYTE   FirstResponseBlock[1];
    BYTE   sMd5Signature[16];   // if packet signatures required
} HAP_GET_OBJECT_RSP, *pHAP_GET_OBJBCT_RSP;
//
// GET OBJECT RESPONSE BLK HEADER
//
typedef struct {
```

```
    MDWORD dLength;       // Length of response block
#define GETOBJRSP_F_FIC 1              // 0x01 = The first piece of an object (more to follow)
#define GETOBJRSP_F_MIC                2 // 0x02 = A middle piece of an object (more to follow)
#define GETOBJRSP_F_LIC                4 // 0x04 = The last piece of an object
#define GETOBJRSP_F_OIC (GETOBJRSP_F_FIC|GETOBJRSP_F_LIC)// 5=Entire Object
#define GETOBJRSP_F_VERACK 8           // 0x08 = Verification Acknowledgement
#define GETOBJRSP_F_GETACK 0x10        // 0x10 = Get Acknowledgement
#define GETOBJRSP_F_REPLACK 0x20       // 0x20 = Replication Acknowledgement
    WORD  wFunction;   // Function of response
#define GETOBJRSP_M_COMPSLOT_INC 0x01  // 0x01 = Compression Slot Follows
#define GETOBJRSP_M_OBJNAME_INC 0x02   // 0x02 = Object Name Follows
#define GETOBJRSP_M_VERINFO_INC 0x04   // 0x04 = Verification Info Follows
#define GETOBJRSP_M_NAMEIMP 0x08 // 0x08 = Name Implied by previous command
#define GETOBJRSP_M_PAYLOAD_INC  0x10  // 0x10 = Payload included
#define GETOBJRSP_M_ERRORLOC  0x20     // 0x20 = Error locating object
WORD  wMask;           // Additional info for response block
} HAP_GET_OBJECT_RESPONSE_BLOCKHDR,
*pHAP_GET_OBJECT_RESPONSE_BLOCKHDR;
//
// GET OBJECT RESPONSE BLK
//
typedef struct {
    HAP_GET_OBJECT_RESPONSE_BLOCKHDR  Hdr;      // fixed header
    MWORD  wSlot;                   // (ifbMask|=0x01) Compression slot
    BYTE  sObjectName[1];           // (if bMask|=0x02) Object Name, Variable Length
    MDWORD  dObjectPayloadLength;   // (if bMask|=0x10) Length of Payload
    MDWORD  dObjectPayUnCompLength; // (if bMask|=0x10) UnCompressed Payload Length
    WORD   wCompressionAlgorithm;   // (ifbMask|=0x10) Compression Algorithm
    BYTE   ObjectData[1];           // (if bMask|=0x10) Payload, Variable Length
    MDWORD   dErrorStatus;          // (if bMask|=0x20) Error status
} HAP_GET_OBJECT_RESPONSE_BLOCK,*pHAP_GET_OBJECT_RESPONSE_BLOCK;
```

In order to generate the signature, each BSG 44 and 56 employ a protocol for performing a cyclic redundancy check (CRC) on the specified data which includes signature and coordinates (an offset into the file and specifying length of the data). The protocol the CRC employs is a fast method for generating a 64 bit CRC on a 32 bit CPU, The existing bit structure on a 32 bit CPU is that of the type pppfcs32 algorithm described in RFC 1662.TXT by W. Simpson.

The invention modifies the structure as follows: The 64 bit value will consist of two parts:

1. The existing 32 bit value will be utilized.

2 An additional 32 bits will be derived by dividing the length by four and performing the operation on four groups of the byte stream. On each of the four instances the least significant 8 bytes of the "in progress" frame check sequence (a 32 bit value computed by repetitively exclusive-oring a constant retrieved by indexing a character stream into a table of contents) will be appended to a second 32 bit number which was initialized to zero.

Modification is as follows:

```
/*Function*/ void PppFcs64(cp, len, fcsarray)
//
// Calculate an 8 new FCS given the current FCS and the new, data.
// Note! Do not attempt to use this if the length of the
// data stream is less than eight bytes.
//
//
)
register u32 fcs;
register unsigned char *cp;
register int len, remainder;
register unsigned char fcsarray[8]
{
register int I, lenBy4;
    fcs 0
    LenBy4 = len>>2; // Divide length by 4 (shift right 2)
    remainder = len - (LenBy4+LenBy4+LenBy4);
```

```
    fcs=pppfcs32( fcs, cp, LenBy4);
    fcsarray[4] = (unsigned char) fcs;
    cp += LenBy4;
    fcs = pppfcs32( fcs, cp, LenBy4);
    fcsarray[5] (unsigned char) fcs;
    cp += LenBy4;
    pppfcs32( fcs, cp, LenBy4);
    fcsarray[6] - (unsigned char) fcs;
    cp +== LenBy4;
    fcs = pppfcs32( fcs, cp, Remainder);
    fcsarray[7] (unsigned char) fcs;
    *(( unsigned long *) fcsarray) ntohl( fcs );
```

These signatures of data which are generated are placed through the comparator 58, which, for example, are in this case associated with the cache verifying computer 14. It is recognized that other locations for the comparator 34 may exist. The comparator 34 then determines whether the signatures of data match. It is recognized that other types of verification tools may be employed to carry out the present invention such as the MD5 algorithm which is described in RFC1322.TXT by R. Rivest.

In order to generate the Signature of Directory, the DSG 57 is employed by the CVA 53, Referring to FIG. 750, the procedure used to calculate the Signature of directory is described below:

```
typedef struct {
    BYTE  bCentury;   // 0x13 means nineteen hundred something
    BYTE  bYear;      // 0x60 means 96
    BYTE  bMonth;     // 0x01 means January, 0x0c = dec.
    BYTE  bDay;       // 0x01 through 0x1F
    BYTE  bHour;      // 0x00 thru 0x17
    BYTE  bMinute;    // 0x00 thru 0x3B
    BYTE  bSecond;    // 0x00 thru 0x3B
} NETWORK_TIME, *PNETWORK_TIME;
typedef struct {
    BYTE  ZFileName[32];  //null padded
```

```
NETWORK_TIME  sTime;
    MDWORD   dSize;      //up to 4 Gig.
} DIR_SUBOBJECT;
```

With respect to the operative steps 750 et seq., the CVA 54 initializes 751 the signature to a value of zero. CVA 54 retrieves 752 the first directory sub-object from FS 18 and expresses this as described in the DIR_SUBOBJECT data structure. CVA 54 asks "is this the last directory sub-object?" 753. If the answer is no then CVA 54 factors 754 the signature of the sub-object into the signature of directory by invoking the logic CSXorDirEntry below:

```
void CSXorDirEntry(BYTE *lpSignature,POD_DIR_INFO lpOdDirInfo)
{
DWORD *lpdSign = (DWORD *)lpSignature;
DWORD *lpdDirInfo = (DWORD *)lpOdDirInfo;
int I;
int j=0;
 for (I=0;i < (sizeof(OD_DIR_INFO)/sizeof(DWORD));I++,
 lpdDirInfo++)
  {
   lpdSign[j]^ = *lpdDirInfo;
   j = 1-j;
  }
}
```

CVA 54 then retrieves the next directory sub-object from FS 18 and proceeds to 753. If the answer to 753 is yes the then CVA 64 "sends" 756 back to NFOC 42 via reverse channel.

The remote client computer 12 is also preferably designed with a predefined portion of its memory 34 operably associated with the NFOC 42 for storing A hit ratio@ defined as the percentage of times that a READ request for a particular data was successfully verified to be in cache memory out of a predetermined number of attempted verifications. The remote client computer 12 employs HRA 45 as an operative means which keeps a record of file names that have been determined to be unworthy of caching because previously determined hit ratios fell below the predetermined threshold and, thus, future accesses of the data to such files will be inhibited from being subject to the processes defined herein. In other words, the HRA 45 dumps data from cache memory if the data associated hit ratio was less than a predetermined number, otherwise the data remains in cache memory.

While the preferred embodiment has been set forth above, it is done so only by way of example and not intended to be limiting to the scope of the claims appended hereto. It is believed that modifications and variations of the present invention will be readily apparent to those skilled in the art will be coming within the scope of the claims hereto.

What is claimed is:

1. An apparatus for increased data access from data of the type including at least one of a file, an object and a directory in a file/object oriented network, which comprises:
    a file/object server computer having an operating system, a first memory, a permanent storage memory and a processor;
    a cache verifying computer operably connected to said file/object server computer in a manner to form a network for rapidly transferring data, said cache verifying computer having an operating system, a first memory and a processor with means for performing an operation on data stored in said permanent storage memory of said file server computer to produce a signature of said data;
    a remote client computer having an operating system, a first memory, a cache memory and a processor with means for performing an operation on data stored in said cache memory to produce a signature of said data;
    a communication server operably connecting to said remote client computer to said cache verifying computer and said file/object server computer; and
    a first comparator operably associated with said cache verifying computer for comparing said signatures of data with one another to determine whether said signature of data of said remote client is valid.

2. The invention in accordance with claim 1, which includes a second comparator operably associated with said remote client computer for comparing said signatures of said data with one another to determine whether said signature of data of said remote client is valid.

3. The invention in accordance with claim 1, which further includes means operably associated with said remote client computer for filtering said data in a manner to preclude predetermined data from being manipulated from said cache memory of said remote client computer.

4. The invention in accordance with claim 1, which further includes means operably associated with said remote client computer for evaluating said object for presence in said cache memory of said remote client computer and determining said object as valid.

5. The invention in accordance with claim 1, which further includes means operably associated with said remote client computer and said cache verifying computer for replicating and synchronizing said data.

6. The invention in accordance with claim 5, which further includes means operably associated with said replicating and synchronizing means for compressing and decompressing said data.

7. The invention in accordance with claim 1, wherein said network file/object cacher includes means responsive to each said comparison performed by each said comparator on said data for generating and storing a validation ratio for said data in a third memory and for removing said data from said cache memory when said validation ratio drops below a predetermined value.

8. The invention in accordance with claim 7, wherein said storing and removing means is further defined to preclude said data having a validation ration less than said predetermined value from reentering said cache memory.

9. The invention according to claim 1, wherein said cache verifying computer includes means for recognizing a LOCK request from said remote client computer and for obtaining a lock on said data from said file server computer in response to said LOCK request.

10. The invention in accordance with claim 9, wherein said LOCK recognizing means is further defined as a proxy for said remote client computer for allowing one of a subsequent READ/WRITE request and GET-OBJECT request to occur on behalf of said remote client.

11. The invention in accordance with claim 1, wherein said first memory of said remote client computer is disposed in a RAM of said remote client computer, said first memory of said cache verifying computer is disposed in a RAM of said cache verifying computer, said first memory of said file/object server computer is disposed in a RAM of said file/object server computer and said permanent storage memory is disposed on a permanent storage disk of said file/object server computer and said cache memory is disposed on a permanent storage disk of said remote client computer.

12. The invention in accordance with claim 1, wherein said cache verifying computer has said communications server integrally formed therewith.

13. A method, performed by computers in a file/object oriented network for increased speed of access of data, which comprises:

- using a file/object server computer having an operating system, a first memory, a permanent storage memory and a processor;
- using a cache verifying computer operably connected to said file/object server computer in a manner to form a network for rapidly transferring data, said cache verifying computer having an operating system, a first memory and a processor;
- using a remote client computer having an operating system, a first memory, a cache memory and a processor;
- using a communication server operably connected to said remote client computer to said cache verifying computer and said file/object server computer;
- establishing a processor element in said cache verifying computer which recognizes at least one of a READ REQUEST, a GET-OBJECT REQUEST and a DIRECTORY REQUEST by said remote client computer and obtains said data from said file/object server computer associated with one of a file, an object and a directory and generates a signature of said data associated with of one of said file, said object and said directory;
- establishing a processor element on said remote client computer which initiates upon one of a READ REQUEST, a GET-OBJECT REQUEST and a DIRECTORY REQUEST from the cache memory to generate a signature of said data associated with of one of said file, said object and said directory;
- using a first comparator operably associated with said cache verifying computer for comparing said signatures of data of said file with one another to determine whether said signature of data of the file of said remote client is valid.

14. The method of the invention in accordance with claim 13, which further includes the steps of using a second comparator operably associated with said remote client computer for comparing said signatures of data of said directory with one another to determine whether said signature of data of said directory of said remote client is valid.

15. The method of the invention in accordance with claim 13, which further includes the steps of using a third comparator operably associated with said remote client computer for comparing said signatures of data of said object with one another to determine whether said signature of data of said object of said remote client is valid.

16. The method of the invention in accordance with claim 13, which further includes the steps of:
- establishing in said remote client computer a processor element responsive to each comparison of said signature data;
- generating a validation ratio for said data;
- storing said validation ratio in a third memory of said remote client computer; and
- removing said data from said cache memory when said validation ratio drops below a predetermined value.

17. The method of the invention in accordance with claim 16, wherein the step of removing is further characterized to induce preventing said data from reentering said cache memory.

18. The method of the invention in accordance with claim 13, which further includes the steps of:
- establishing in said cache verifying computer a processor element responsive to each said LOCK request from said remote client computer; and
- obtaining a lock on said data from said file/object server computer in response to said LOCK request.

19. The method of the invention in accordance with claim 18, which further includes the steps of establishing in said verifying computer a processor element responsive to each said READ/WRITE request from said remote client computer, and performing said READ/WRITE request on behalf of said remote client computer.

* * * * *